United States Patent
Mirhoseini et al.

(10) Patent No.: US 11,136,247 B2
(45) Date of Patent: Oct. 5, 2021

(54) POLYMER NANOCOMPOSITE BASED COMPOSITION AND METHOD FOR CONTROLLING WATER HARDNESS

(71) Applicants: Farid Mirhoseini, Arak (IR); Alireza Salabat, Arak (IR)

(72) Inventors: Farid Mirhoseini, Arak (IR); Alireza Salabat, Arak (IR)

( * ) Notice: Subject to any disclaimer, the term of this patent is extended or adjusted under 35 U.S.C. 154(b) by 293 days.

(21) Appl. No.: 16/519,163

(22) Filed: Jul. 23, 2019

(65) Prior Publication Data

US 2021/0024379 A1    Jan. 28, 2021

(51) Int. Cl.

| C02F 1/42 | (2006.01) |
|---|---|
| C02F 1/50 | (2006.01) |
| B01J 39/07 | (2017.01) |
| B01J 39/20 | (2006.01) |
| B01J 47/024 | (2017.01) |
| B01J 47/018 | (2017.01) |

(52) U.S. Cl.
CPC ............ *C02F 1/42* (2013.01); *B01J 39/07* (2017.01); *B01J 39/20* (2013.01); *B01J 47/018* (2017.01); *B01J 47/024* (2013.01); *C02F 1/50* (2013.01); *C02F 2001/425* (2013.01); *C02F 2201/006* (2013.01); *C02F 2303/04* (2013.01)

(58) Field of Classification Search
None
See application file for complete search history.

(56) References Cited

U.S. PATENT DOCUMENTS

| 5,788,410 A * | 8/1998 | Stucks ............... E03F 5/16 405/107 |
|---|---|---|
| RE37,181 E * | 5/2001 | Hunniford ........... C02F 3/345 210/610 |
| 9,533,264 B2 * | 1/2017 | Kong .............. B01D 67/0079 |
| 2008/0194736 A1 * | 8/2008 | Lu ..................... C08J 5/005 524/35 |
| 2011/0014091 A1 * | 1/2011 | Hitzman ............ B01J 19/088 422/186.24 |

(Continued)

*Primary Examiner* — Chester T Barry

(57) ABSTRACT

A nanocomposite composition for controlling water hardness and a method of producing the nanocomposite, is disclosed. The nanocomposite composition comprises a plurality of semi-interpenetrating polymer network/zeolite-silver nanocomposite, including a polymer matrix. The polymer matrix is dispersed with a plurality of zeolite nanoparticles and a plurality of silver nanoparticles. The method of producing semi-interpenetrating polymer networks/zeolite-silver nanocomposite as hydrogel form comprises microemulsion polymerization of monomeric mixture uses methyl methacrylate (MMA) in presence of ethylene glycol dimethacrylate (EGDM) cross-linker for MMA monomer, acrylamide (AAm), acrylic acid (AAc) and linear poly vinyl alcohol (PVA) monomers in the presence of N,N'-methylene bisacrylamide (MBA) cross-linker and TX-100 surfactant. Further, the prepared nanocomposite is a water hardness removal filter and an efficient inhibition of sulfate-reducing bacteria nanocomposite. Also, the water filter cartridge exhibits a stable filtration performance during large scale production with reduced fluctuation infiltration flow rate and shows highly stable behaviors in high salt concentration.

11 Claims, 14 Drawing Sheets

(56) References Cited

U.S. PATENT DOCUMENTS

| | | | |
|---|---|---|---|
| 2014/0274706 A1* | 9/2014 | Hyde | A01G 7/06 504/116.1 |
| 2016/0017206 A1* | 1/2016 | Coates | C09K 8/532 166/250.01 |
| 2017/0145638 A1* | 5/2017 | Lojewska | B65D 65/02 |
| 2019/0345062 A1* | 11/2019 | Yang | C01B 33/44 |
| 2020/0071469 A1* | 3/2020 | Cochran | C09K 8/03 |
| 2020/0246757 A1* | 8/2020 | Hoek | C02F 1/4618 |
| 2021/0107804 A1* | 4/2021 | Silveira | C02F 1/001 |

* cited by examiner

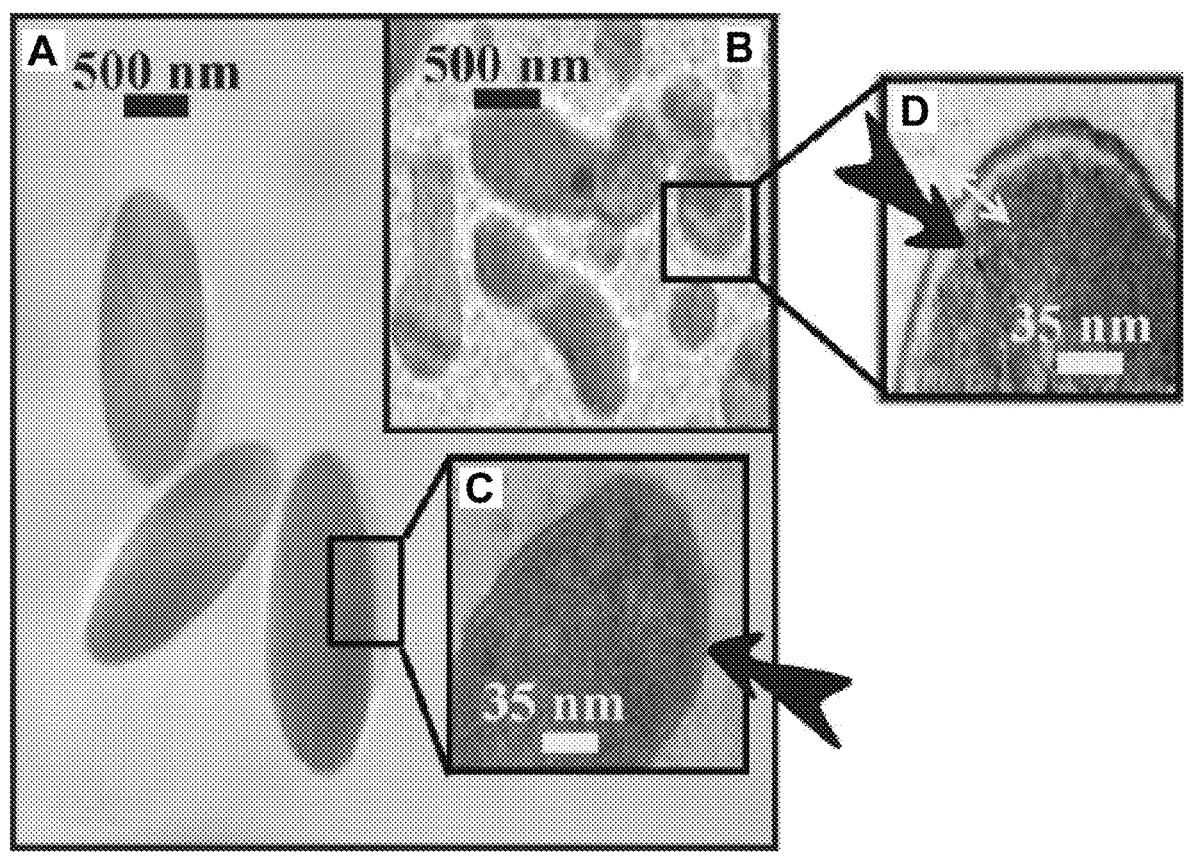
FIG. 10A-D

POLYMER NANOCOMPOSITE BASED COMPOSITION AND METHOD FOR CONTROLLING WATER HARDNESS

BACKGROUND OF THE INVENTION

Water is one of the most important basic resources and a critical human requirement for the survival and sustainability. The existence of ionic impurities such as metals of earth alkaline of the soluble Ca(II) and Mg(II) salts can lead to unsuitable behavior of hard water solutions that causes problems for drinking-water, steam generation, heating and cooling systems and manufacturing industries.

Ion exchange technology related industries use water softening process, other purification, separation processes due to their simplicity in nature. The ion exchange system works under the principle of exchanging mobile ions with a fixed ion. A variety of the polymeric resins having weakly acid carboxylic functionalities or strongly acid sulfonic are usually used for the ion exchange processes. There are several researches reports the utilization of polymeric resins for the removal of hardness of calcium and magnesium from water. For instance, Amberlite IRC 748 as $K^+$ form resin that is obtained from potassium chromate solution, which is applied for removal of Ca(II) and Mg(II). Amberlite IR 120 as $H^+$ form resin is used for Ca(II) and magnesium adsorption.

The ionic impurities and microorganisms cause many undesirable effects. Microorganism includes all of kind of bacteria, which can be found everywhere. They spread in the air, water and soil. They play many important roles in nature, especially their damaging role in causing corrosion. Corrosion is a damaging phenomenon, which causes lots of problems. The corrosion could be observed in buildings, bridge, installation and facilities in harbors and cities and also industrial organization. Among different important bacteria, sulfate-reducing bacteria (SRBs) plays an important role in corrosion. SRBs are main microorganisms that can anaerobically generate sulfide species during the respiration process in biofilm, which causes bio-corrosion.

Moreover, microorganisms produce hydrogen sulfide ($H_2S$) for their metabolism, which is toxic, corrosive, and responsible for a variety of environmental and economic problems including reservoir souring, contamination of natural gas and oil, corrosion of metal surfaces, and the plugging of reservoirs due to the precipitation of metal sulfides. The $H_2S$ turns the neutral condition into acid and directly causes corrosion in installation, especially installation working in water and sea. In addition, they target the iron in the environment and produce black rust called Iron sulfide.

Though prior art discloses water purification filters to remove microorganism and preparation of nanocomposite for water purification, there exist a need for a nanocomposite for efficiently controlling the water hardness. Also, there is a need for a stable nanocomposite and a water filter cartridge to exhibit stable filtration in the high salt concentration.

SUMMARY OF THE INVENTION

One aspect of the present disclosure is directed to a composition for controlling water hardness, comprising a plurality of semi-interpenetrating polymer nanocomposite, including a polymer matrix dispersed with a plurality of zeolite nanoparticles and a plurality of silver (Ag) nanoparticles. In one embodiment, the silver nanoparticles with homogeneous particle size distribution is dispersed in the zeolite nanoparticles with a mono-dispersed particle size distribution.

Another aspect of the present disclosure is directed to a filter cartridge assembly for a water treatment device, comprising a housing incorporated with a plurality of semi-interpenetrating zeolite-silver (Ag) polymer nanocomposite, including a cross-linked polymer matrix dispersed with a plurality of zeolite nanoparticles and a plurality of silver nanoparticles. In one embodiment, the housing is a tubular polycarbonate housing. In one embodiment, the polymer matrix is a cross-linked polymethyl methacrylate (PMMA).

In another embodiment, the nanocomposite is polymerized using methyl methacrylate (MMA) in presence of ethylene glycol dimethacrylate (EGDM) cross-linker for MMA monomer, acrylamide (AAm), acrylic acid (AAc) and linear poly vinyl alcohol (PVA) monomers in the presence of N,N'-methylene bisacrylamide (MBA) cross-linker and TX-100 surfactant. In one embodiment, the polymer matrix is a cross-linked polymethyl methacrylate (PMMA). In another embodiment, the nanocomposite is in hydrogel form. In one embodiment, the nanocomposite is in resin form. In a related embodiment, the nanocomposite is in pellet form.

Another aspect of the present disclosure is directed to a method of producing a nanocomposite for controlling water hardness, comprising the steps of: (a) forming a stable silver (Ag) colloid in water-in-oil microemulsion; (b) forming a stable zeolite colloid in water-in-oil microemulsion; (c) forming a stable zeolite-silver colloid in water-in-oil microemulsion by mixing the silver and zeolite colloid; and (d) forming a semi-interpenetrating zeolite-silver nanocomposite hydrogel.

In one embodiment, the method further comprises a step of: preparing a water filter cartridge using the semi-interpenetrating zeolite-silver nanocomposite. In another embodiment, the step of forming the stable silver colloid, comprises steps of: dispersing a plurality of silver nanoparticles in water-in-oil microemulsion; mixing the silver nanoparticles with a solution including a surfactant, acyl amide, N,N'-methylene bisacrylamide, NaOH and methyl methacrylate (MMA) monomers; and forming the stable silver colloid by adding co-surfactant.

In one embodiment, the step of forming the stable zeolite colloid, comprises steps of (a) dispersing a plurality of zeolite nanoparticles in water-in-oil microemulsion; (b) mixing the zeolite nanoparticles with a solution including a surfactant, acyl amide, N,N'-methylene bisacrylamide, NaOH and methyl methacrylate (MMA) monomers; and (c) forming the stable zeolite colloid by adding co-surfactant. In one embodiment, the surfactant is octylphenol ethylene oxide. In another embodiment, the zeolite is NaY zeolite.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

FIG. 10A exemplarily illustrates the untreated *Escherichia coli*;

FIG. 10B exemplarily illustrates the treated *Escherichia coli* with polymer/zeolite-Ag nanocomposite sample;

FIG. 10C exemplarily illustrates the untreated *Escherichia coli* with normal cytoplasm membrane;

FIG. 10D exemplarily illustrates the damaged *Escherichia coli* with a big gap between the cytoplasm membrane;

DETAILED DESCRIPTION

Figure 1:
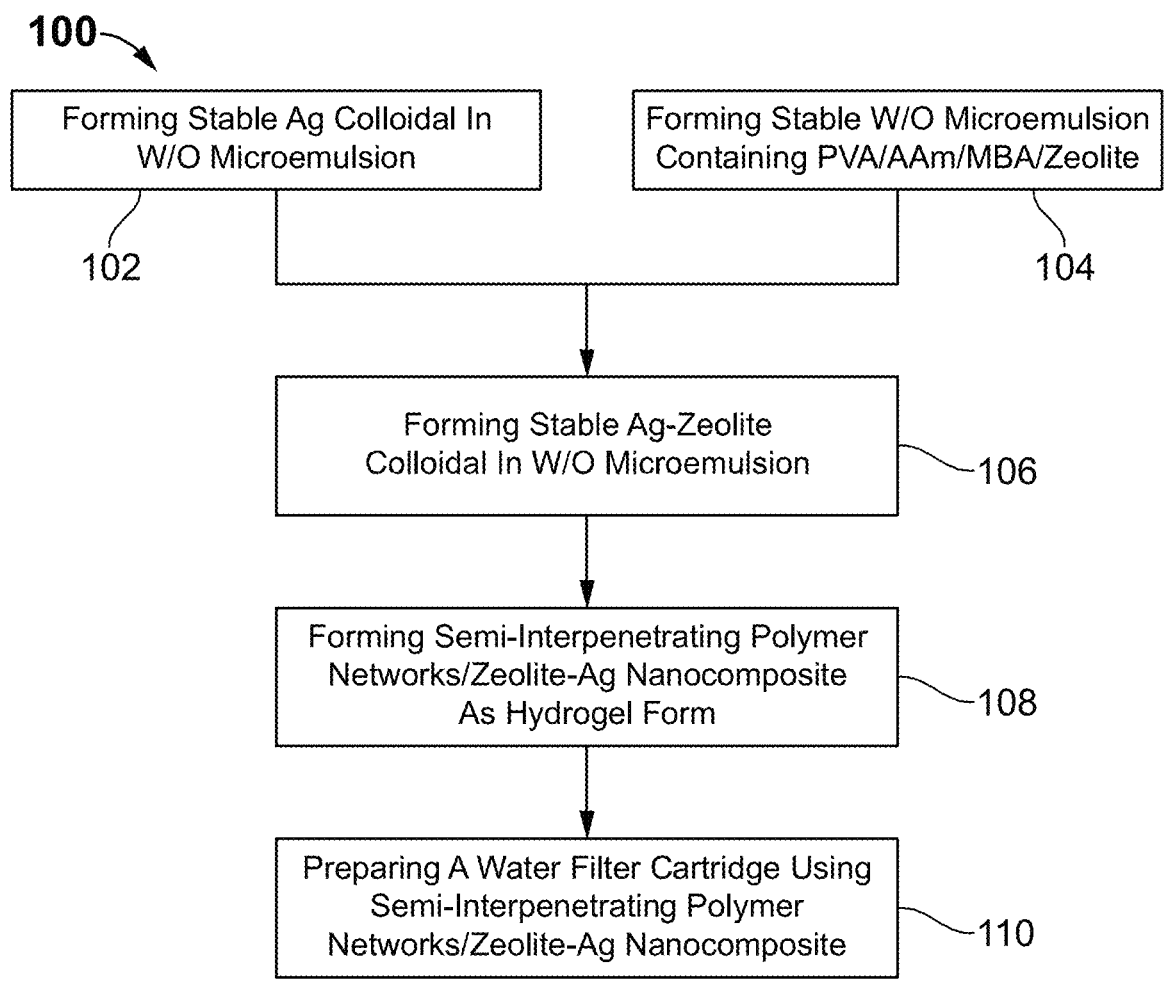
FIG. 1 exemplarily illustrates a method of producing a polymer nanocomposite, according to an embodiment of the present invention.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention generally relates to a composition and method for controlling water hardness. More particularly, the present invention relates to a polymer nanocomposite-based composition and method for controlling water hardness.

In last decade, polymer nanocomposites are introduced as a new class of materials, which has a potentially high economic reward due to their low energy requirements. Among various polymer nanocomposites, polymer-zeolite nanocomposites have gained a considerable importance and also attracted significant interest from researchers due to their unique physical and chemical properties such as crystallinity, thermal stability, well-defined cage structure of molecular size, ion exchange, very stable with very high adsorption capacity and selectivity. The polymer-zeolite nanocomposites have a large active pore structure (microporous) and have a high specific surface area and are used as chemical sieves, water softeners and heavy metal adsorbents.

A composition for controlling water hardness, is disclosed. In one embodiment, the composition comprises a plurality of semi-interpenetrating polymer nanocomposite. The composition includes a polymer matrix dispersed with a plurality of zeolite nanoparticles and a plurality of silver (Ag) nanoparticles. In one embodiment, the silver nanoparticles with homogeneous particle size distribution is dispersed in the zeolite nanoparticles with a mono-dispersed particle size distribution. The nanocomposite is polymerized using a monomer in the presence of a cross-linker, a surfactant, a co-surfactant, a reducing agent and a regenerating agent.

According to the present invention, a water hardness removal filter, a composition and a method of producing the composition for controlling water hardness, is disclosed. In one embodiment, the composition is a polymer nanocomposite used for water harness removal process. The composition is a polymer cation exchange nanocomposite hydrogel and antibacterial agent. In one embodiment, the composition for controlling water hardness, comprises a plurality of semi-interpenetrating polymer nanocomposite, including a polymer matrix dispersed with a plurality of zeolite nanoparticles and a plurality of silver (Ag) nanoparticles.

The silver nanoparticles with homogeneous particle size distribution is dispersed in the zeolite nanoparticles with a mono-dispersed particle size distribution. In one embodiment, the polymer matrix is a cross-linked polymethyl methacrylate (PMMA). In one embodiment, the nanocomposite are polymerized using methyl methacrylate (MMA) in presence of ethylene glycol dimethacrylate (EGDM) as cross-linker for MMA monomer, acrylamide (AAm), acrylic acid (AAc) and linear poly vinyl alcohol (PVA) monomers in the presence of N,N'-methylene bisacrylamide (MBA) cross-linker and TX-100 as surfactant. In one embodiment, the polymer nanocomposite is in hydrogel form. In another embodiment, the polymer nanocomposite is in resin form. In yet another embodiment, the hydrogel could be manufacture in pellet or bulk shape. In some embodiments, the acrylic or methacrylic acid and/or its lower alkyl ester could be used as a matrix of the cation exchange resin. The hydrogel nanocomposite comprises essentially of NaY zeolite nanoparticles and Ag nanoparticles. In one embodiment, the method for forming the semi-interpenetrating polymer networks/zeolite-Ag hydrogel nanocomposite based microemulsion system is used as a soft template. The water hardness removal filter comprises a polycarbonate tubular vessel, wherein the polymer networks/zeolite-Ag nanocomposite pellets are placed within the vessel for further processing.

Referring to FIG. 1, a method 100 of producing a nanocomposite composition for controlling water hardness, is disclosed. The nanocomposite is synthesized by microemulsion polymerization. The composition is a polymer nanocomposite and antibacterial agent or biocides for inhibition of bacteria. In one embodiment, the method 100 of producing the nanocomposite composition comprising the following steps. At step 102, a stable Ag-colloid is formed in reverse microemulsion or water-in-oil (w/o) microemulsion. At step 104, a stable zeolite colloid is formed in water-in-oil (w/o) microemulsion. At step 106 a stable zeolite-Ag colloid is formed by mixing the stable Ag-colloid and stable zeolite colloid in water-in-oil (w/o) microemulsion. At step 108, a semi-interpenetrating zeolite-Ag nanocomposite hydrogel is formed by microemulsion polymerization. The method of producing the nanocomposite further comprises a step 110 to prepare a water filter cartridge using semi-interpenetrating zeolite-Ag nanocomposite.

In one embodiment, the stable silver colloid and zeolite colloid are treated with potassium persulfate (KPS) for free radical polymerization, and the polymer/zeolite-Ag nanocomposite hydrogel is produced with emulsion polymerization in water-phase. The resultant nanocomposite is characterized with different techniques such as Fourier-transform infrared spectroscopy (FT-IR), X-ray diffraction (XRD), scanning electron microscopy (SEM), transmission electron microscopy (TEM) and X-ray photoelectron microscopy (XPS).

In one embodiment, the method of producing the nanocomposite may include the following steps. At one step, a stable NaY zeolite colloid is formed by dispersing a plurality of zeolite nanoparticles in water-in-oil microemulsion. At another step, a zeolite colloid is formed by mixing the zeolite nanoparticles with a solution including a surfactant, acyl amide, N,N'-methylene bisacrylamide, NaOH and methyl methacrylate monomers. At another step, a w/o microemulsion containing zeolite nanoparticles is formed by adding acrylic acid co-surfactant. At another step, a stable silver colloid is also prepared by dispersing a plurality of Ag-nanoparticles in w/o microemulsion. At another step, a stable zeolite/Ag colloid is formed by adding silver and zeolite colloid. At another step, the nanocomposite with porosity between about 40% and about 60% is formed by cross-linking and polymerizing the main monomers in emulsion phase contains w/o microemulsion droplets, which is homogenously dispersed in water.

In an embodiment, the zeolite is NaY zeolite comprising, molar ratio of 16 NaOH:1 Al(OH)$_3$:15 SiO$_2$:320 H$_2$O, crystal size of about 0.5 µm-1 µm, pore size of 7.5 angstrom, surface area of 700 m$^2$/g, bulk density of 0.65 g/ml, purity >99 wt. %, spherical shape, SiO$_2$/Al$_2$O$_3$=6. Based on the high stability in microemulsion, a desired amount of zeolite is used. In one embodiment, the amount of zeolite is 0.01 wt. % to 2 wt. %, and preferably 0.2 wt. % to 0.5 wt. %, per wt. % of main monomer.

In an embodiment, octylphenol ethylene oxide (triton X-100, TX-100) as non-ionic surfactants is used. The surfactant may have a concentration between about 0.1 mol/L to 1 mol/L in MMA monomers. The concentration of the TX-100 is 0.2 mol/L to 0.5 mol/L, and preferably 0.3 mol/L. In one embodiment, AAc is used as co-surfactant and as monomer due to its hydrophilicity and high reactivity. In one embodiment, the amount of the monomer is 2 to 20 mole % and preferably 4 mole % to 10 mole %, per mole of main monomer. In one embodiment, silver nitrate (AgNO$_3$) is used as a source of metal nanoparticles (silver nanoparticles). The fresh silver nitrate solution may have the concentration between about 0.01 mol/L to 1 mol/L. in one embodiment, the concentration of the silver nitrate solution is 0.02 mol/L to 0.08 mol/L, and preferably 0.05 mol/L.

In one embodiment, NaOH is used as reducing agent in the preparation of silver nanoparticle in polymer hydrogel nanocomposite and as regeneration agent. More preferably, 30 wt. % NaOH solution (w/w) is used in the preparation of silver nanoparticle. In this concentration, AAc is neutralized with NaOH. If the amount of NaOH is too small, the resulting copolymer particles are not formed properly. If it is too large, the amount of AAc in MMA decreases and an exchange group is not introduced. More preferably, the stable silver colloid microemulsion is prepared by fixing the mole ratio of water to surfactant as 9 (W=9). In one embodiment, the mole ratio of water to surfactant (W) may have a value between about 5 and about 100.

The composition or molar ratios of reactants in microemulsion formulation for PVA/AAm/AAc/NaY zeolite is $0.5 \times 10^{-4}$ to 0.01, 1 to 5 and (0.1 to 3), respectively. The amount of BMA is determined according to the desired degree of cross-linking of the methyl methacrylate polymer and AAm, and is 0.8 to 55 mole %, preferably 1.5 to 45 mole %, per mole of main monomer. EGDM 0.1 wt % to 1 (with respect to the MMA monomers), preferably 0.3 is added. The cross-linker agent may include one of ethylene glycol dimethacrylate (EGDMA), triethylene glycol, or combinations thereof. The production of cation exchange semi-interpenetrating polymer networks/zeolite-Ag hydrogel form nanocomposite to use a copolymer containing acrylic acid, methacrylic acid or lower alkyl ester thereof as copolymer particles.

According to the present invention, the monomers are emulsion polymerized. Usually, water is used as a dispersing medium for main monomer (microemulsion droplets), and the amount thereof is 1 to 100 times the weight of the monomers due to change type of microemulsion from w/o microemulsion to o/w microemulsion. The PVA is used with a vital and different role for hydrogel nanocomposite preparation. The linear PVA monomers increase the strength of the gel due to the formation of semi-interpenetrating polymer networks. In one embodiment, the conventional polymerization initiators such as benzoyl peroxide as hydrophobic initiator, potassium persulfate as hydrophilic initiator and axo-type catalysts are usually be used in the suspension and also microemulsion polymerization. The amount of the polymerization initiator is in the range of 0.01% to 15% by weight based on the weight of the monomers. In one embodiment, the polymerization is carried out at a temperature in the range of 50° C. to 90° C. for about a period of 1 to 4 hours.

In one embodiment, the polymerization comprises, (a) charging a polymerization reactor with predetermined amounts of oil (main monomer) and the dispersing agent; (b) adding the above mixture with the polar phase under stirring comprising, zeolite and silver nanoparticles, and acrylamide, acrylic acid as co-surfactant, N,N'-methylene bisacrylamide as cross-linker agent having the polymerization initiator dissolved therein to form an oil-in-water type emulsion state; and (c) polymerizing the monomers at a predetermined temperature while blowing N$_2$ gas.

The semi-interpenetrating polymer networks/zeolite-Ag nanocomposite obtained by the emulsion polymerization is usually in bulk form. The required crack-free beads having a particle diameter of about 0.1 mm to 1.0 mm could be produced with increasing water amount in polymerization batch. The semi-interpenetrating polymer networks/zeolite-Ag nanocomposite particles are collected and washed in conventional manner, and after, as required for sulfonation of polymer matrix. The sulfonation is usually performed by stirring the polymer matrix in 95% to 100% sulfuric acid. The amount of sulfuric acid used is 2 to 35 times the weight of the semi-interpenetrating polymer. The sulfonation could be carried out usually at a temperature of 50° C. to 150° C., and preferably 90° C. to 110° C., for about 3 to 30 hours, and being converted from its H-form to Na-form. The recovered NaY zeolite eliminates the sulfonation.

Generally, a water purifier used at home and industries are capable of purifying raw water up to 10 liters at a time. In one embodiment, a pitcher type water purifier filter cartridge is used as a water purifier. The water purifier comprising, an outer container or outer container basket, an inner container or inner container basket, and a water filter cartridge formed inside the inner container. The inner container is formed to be detachable from the outer container and to divide the inside of the outer container to an upper part and a lower part.

The pitcher type water purifier further comprises, a purified water reservoir and a raw water reservoir. The purified water reservoir is a region of the outer container that is below the inner container. The raw water reservoir is a region of the outer container that is above the inner container. The water in the raw water reservoir slowly passes through the water filter cartridge including polymer/zeolite-Ag hydrogel nanocomposite to be purified by virtue of its own weight, and flows into the purified water reservoir. As a water filter cartridge, a cartridge semi-interpenetrating polymer networks/zeolite-Ag hydrogel nanocomposite is used as a filtering material. The filtering material is fixed into the inner container basket without being mediated by a partition member.

According to the water filter cartridge, the raw water is filtered by semi-interpenetrating polymer networks/zeolite-Ag hydrogel nanocomposite only after being in contact with polymer/zeolite-Ag hydrogel nanocomposite. The hydrogel layer purifies the raw water as free of microbes, even when there is proliferation of microbes in the hydrogel layer. Furthermore, due to the absence of a partition member a simple design of filter cartridge with hydrogel nanocomposite with good swell-ability and semi-interpenetrating polymer networks, filtration flow rate is high and raw water can be purified smoothly.

The operating variables such as depending on pH, stirrer speed of the solutions and amount of the applied nanocomposite hydrogel as a function of contact time between sample phase and artificial hard water solution and also the molar compositions effect of AAc and MBA are studied. As a second application, the antibacterial activity is also studied. The systems have attracted many interest's duo to might combine the characteristics and properties of polymer network, zeolite and Ag nanoparticles for a variety of application. According to the antibacterial results, the prepared nanocomposite shown highly concentration-independent inhibition of SRBs activity. According to the present invention, the process of the present invention is very desirable for industrial practice.

The monomer used in the present disclosure can be at least any one from the group comprising methyl methacrylate (MMA), acrylamide (AAm), acrylic acid (AAc) and linear poly vinyl alcohol (PVA). The crosslinker of the present disclosure may be any one from the group comprising ethylene glycol dimethacrylate (EGDM) and N,N'-methylene bisacrylamide (MBA). The ethylene glycol dimethacrylate (EGDM) could be at least any one of ethylene glycol dimethacrylate (EGDMA), triethylene glycol, and combinations thereof. The surfactant may be octylphenol ethylene oxide (triton X-100, TX-100).

The nanocomposite may be polymerized using methyl methacrylate (MMA) in presence of ethylene glycol dimethacrylate (EGDM) cross-linker for MMA monomer, acrylamide (AAm), acrylic acid (AAc) and linear poly vinyl alcohol (PVA) monomers in the presence of N,N'-methylene bisacrylamide (MBA) cross-linker and TX-100 surfactant. The prepared polymer matrix may be a cross-linked polymethyl methacrylate (PMMA). The nanocomposite may be in hydrogel form, or in the form of a resin.

Also disclosed herein is a filter cartridge assembly for a water treatment device. This device comprises a housing incorporated with a plurality of semi-interpenetrating zeolite-silver polymer nanocomposite. The housing may be a tubular polycarbonate housing or tubular polycarbonate vessel. The semi-interpenetrating zeolite-silver polymer nanocomposite may include a cross-linked polymer matrix dispersed with a plurality of zeolite nanoparticles and a plurality of silver nanoparticles. The zeolite-silver nanocomposite may be utilized as a filtering material and is fixed into an inner container of the water treatment device, thereby removing water hardness from a raw water.

A method of producing a nanocomposite for controlling water hardness comprising the following steps. At one step, a stable silver colloid is formed in water-in-oil microemulsion. The stable silver colloid is formed by dispersing a plurality of silver nanoparticles in w/o microemulsion, mixing the silver nanoparticles with a solution including a surfactant, acyl amide, N,N'-methylene bisacrylamide, NaOH and methyl methacrylate (MMA) monomers, and forming the stable silver colloid by adding co-surfactant. At another step, a stable zeolite colloid is formed in water-in-oil microemulsion. The stable zeolite colloid is formed by dispersing a plurality of zeolite nanoparticles in water-in-oil microemulsion, mixing the zeolite nanoparticles with a solution including a surfactant, acyl amide, N,N'-methylene bisacrylamide, NaOH and methyl methacrylate (MMA) monomers, and forming the stable zeolite colloid by adding co-surfactant.

At another step, a stable zeolite-silver colloid is formed in water-in-oil microemulsion by mixing the silver and zeolite colloid. At another step, a semi-interpenetrating zeolite-silver nanocomposite hydrogel is formed. The resulting nanocomposite hydrogel is soaked in excess water for overnight, then dehydrated with ethanol and dried for a predefined temperature and time. The method further comprises a step of preparing a water filter cartridge using the semi-interpenetrating zeolite-silver nanocomposite. in one embodiment, the zeolite is NaY zeolite.

The present invention is described in more detail by reference to the following examples and comparison examples, which, however, are not to be construed as limiting the present invention.

EXAMPLES

Example-1: Preparation of Stable Ag Colloid in W/O Microemulsion

A stable microemulsion containing Ag nanoparticles is prepared by reverse microemulsion method as shown in step 102 of FIG. 1, wherein the preparation of stable Ag colloid is explained here in detail. TX-100 of about 2 g is added to MMA monomer of about 10 ml into a 100 ml beaker. The mixture of TX-100 and MMA in the beaker is stirred under magnetic stirring to form a clear solution with a concentration of about 0.3 M. the stirring speed is set to about 500 rpm. In some embodiments, the surfactant solution may include ore or more surfactants dissolved in a plurality of MMA monomers as a solvent. An aqueous solution of $AgNO_3$ of about 0.5 ml is added to the surfactant solution to obtain a cloud solution. In order to form a clear and stable microemulsion, the system is titrated with AAc of about 1 ml and the system is stirred strongly. In this procedure, AAc is used as a co-surfactant and also as the monomer for its hydrophilicity and high reactivity. The process is carried out at a temperature of 60° C., and oil bath is used for this purpose. A same microemulsion containing fresh aqueous solution consists of 30 wt. % of NaOH solution (w/w) is prepared and added dropwise to the microemulsion containing silver ions that is introduced at above in 5 mins. The AAc is neutralized with NaOH, whereas the stirring process is lasted for 30 mins, and the reaction mixture changed from highly transparent to light brown due to the formation of Ag colloid system. The SPR of the 432 nm corresponded to the formation of Ag nanoparticles in microemulsion system is confirmed by UV visible spectroscopy. It is noted that the microemulsion is prepared by fixing the mole ratio of water to surfactant as 9 (w=9).

Example-2: Preparation of Stable W/O Microemulsion Containing PVA/AAm/MBA/Zeolite The method of preparing stable W/O microemulsion containing/PVA/AAm/MBA/zeolite of step 104 in FIG. 1 is explained here in detail. Typically, a solution of TX-100 surfactant in MMA solvent with a concentration of 0.3 M is prepared and certain amount of aqueous PVA/AAm/NaOH solution is added. The mixture is stirred at a constant speed for about 30 min at room temperature and then AAc co-surfactant is added due to the formation of stable and transparent W/O microemulsion. Once the stable microemulsion is obtained, the desired amount of BMA is slowly added. The solution is deoxygenated by means of nitrogen during the mixing process. After the addition of BMA, the desired amount of zeolite based on the high stability in microemulsion for a long time that is kept under ultrasound for 1 hour before use for getting nanosized, is slowly added to the monomer mixture and stirred for another 2 hours while stirring is adjusted at a speed of about 500 rpm to ensure the completion of dispersion of zeolite in microemulsion system. In an embodiment, the TiO2/IL colloid is a stable colloid for a long period of time, for instance for several months. The composition of reactants in microemulsion formulation for PVA/AAm/AAc is 2×10-4, ⅕ and (0.5-3), respectively. In an embodiment, in this designed procedure linear PVA monomers increase the strength of the gel due to the formation of semi-interpenetrating polymer networks.

Example-3: Preparation of Stable Ag-Zeolite Colloid in W/O Microemulsion

The method of forming a stable Ag-zeolite colloid at step 106 of FIG. 1, is disclosed. In this step, both of the introduced microemulsion (silver and zeolite) are added together and the reaction temperature is controlled at 60° C. (500 rpm stirring). In this step, EGDM 0.3 wt % (with respect to the MMA monomers) is added. A clear system is obtained and to ensure the homogeneity of particle distribution in the monomers, the system changed from W/O microemulsion to O/W emulsion by adding water. In order to change from W/O microemulsion to O/W emulsion, 30 g of distilled water is added into the mixture with the help of a high-speed mixer (3000 rpm).

Example-4: Preparation of Polymer Nanocomposite Hydrogel

The preparation of semi-interpenetrating polymer networks/zeolite-Ag nanocomposite hydrogel at step 108 in FIG. 1 is explained here in detail. Polymerization is initiated by introducing 2.5 wt. % KPS (w/w, related to MMA monomer) as an initiator in order to generate free radicals. KPS is slowly added into to the above system with strong stirring and the temperature of the reaction mixture is rapidly increased to 60° C. during less than 6 min and the polymerization is initiated at this temperature. The system is kept at a static condition in oven and polymerization time is 4 hours. At the end of polymerization, a white gel is obtained, which is cooled down to room temperature. PVC disk shape casts (L/D=1) are used for gel-casting. Gels are separated from the moulds, after five to ten minutes of gel-casting. Further, the gel surface is rinsed with excess distilled water and is dried for a period of about 72 to 96 hours in laboratory condition. After that, the resulting nanocomposite hydrogel is soaked in excess water for overnight, dehydrated with ethanol and dried at 80° C. for 3 h for preparing a water filter cartridge obtained in step 110. The overall experimental procedures are illustrated in FIG. 1 and the preparation steps are explained in detail from example-1 to example-4. The obtained product is removed from the beaker, cut to small pieces, and then dried in laboratory conditions.

Example-5: Characterization

For determining the functional groups in prepared nanocomposite hydrogel, Fourier transform infrared spectrometer (FTIR) is used with the help of KBr pellets. KBr pellets are analyzed on a galaxy series of FT-IR 5000 spectrophotometer (Unicam Co.) in the range of 400 to 4000 $cm^{-1}$. Further, X-ray diffraction (XRD) patterns are measured on zeolite and fabricated polymer/zeolite-Ag nanocomposite hydrogel using a (Philips XRD) PW 1800 diffractometer with a Cu Kα radiation and Ni filter.

A dynamic light scattering (DLS) (nano zeta size-90, Malvern instrument) is used to monitor the formation of nanoparticles. In all measurements, 1 mL of particle suspensions is employed and placed in a 10 mm×10 mm quartz cuvette. The instrument operates at a scattering angle of 90°. In this method, depending on the shape of the nanoparticles, for spherical particles, the hydrodynamic radius of the particle (RH) could be calculated from its diffusion coefficient by the Stoke-Einstein equation:

$$D=(k_BT)/(6\pi\eta R_H) \quad (1)$$

where $k_B$ is the Boltzmann constant, T is the temperature of the suspension, and η is the viscosity of the surrounding media.

The morphology and distribution of Ag nanoparticles in W/O microemulsion and in a large surface of zeolite in the polymer matrix (polymer/zeolite-Ag nanocomposite hydrogel) are observed using a transmission electron microscope (TEM) (Zeiss-EM10C-80 kV). The scanning electron microscopy (SEM) images of zeolite and polymer/zeolite-Ag nanocomposite are obtained with a Hitachi (F 4160) instrument. Further, X-ray photoelectron spectroscopy (XPS) measurements of obtained nanocomposites (before use and after use) are performed using a PHI 54000 XPS instrument with an Al Kα source operated at 350 W and 1-10 Torr. The binding energies are referenced to adventitious carbon (284.8 eV).

Example-6: Water Hardness Removal Study

The main objective of the study is to remove water hardness from synthetic solutions of hard water as a stock solution having a comparable amount of calcium and magnesium hardness that is prepared from magnesium and calcium salts. The experiments are designed to imitate the ion exchange process as the most common method at the laboratory scale due to its simplicity in nature. At first, the solutions of synthetic hard water in the volume of about 1.0 liter is prepared, wherein the volume of about 250 ml of the prepared solution is transferred to the batch reactor for adjusting the pH of the solution to the desired value. The solution from the batch reactor is taken to the flask of 1 liter by diluting to the volume. Finally, the prepared synthetic solution of hard water is used as the stock solution to study the main goal of this research work.

Figure 2:
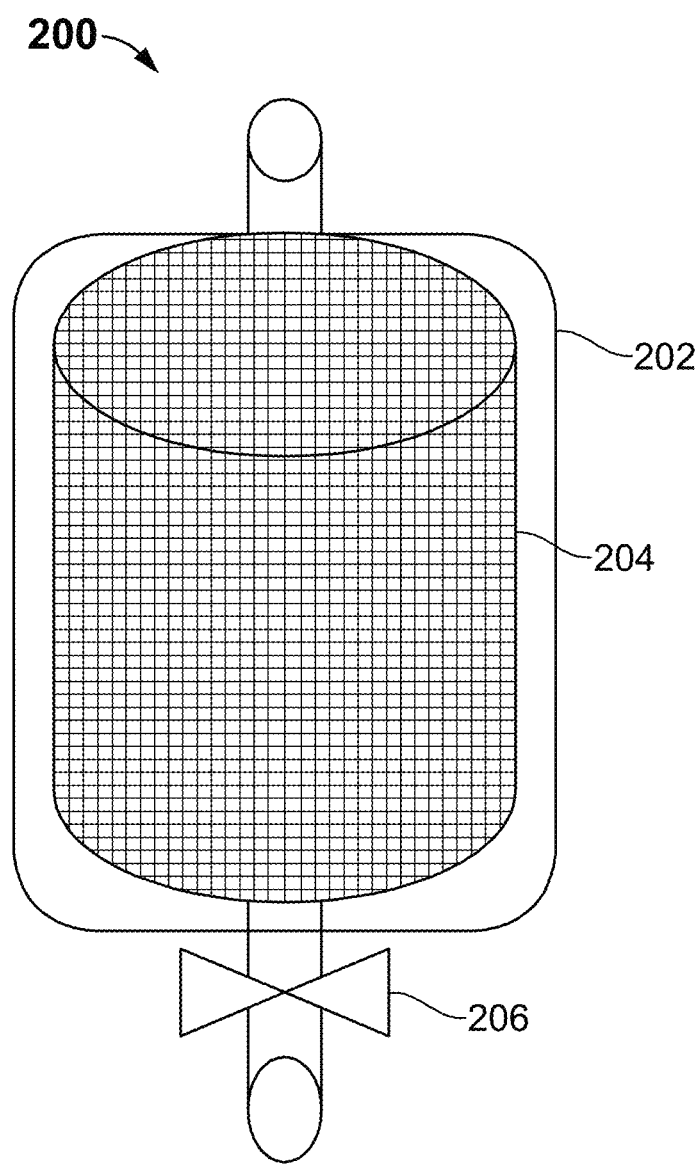
FIG. 2 exemplarily illustrates a basket of a water filter cartridge, according to an embodiment of the present invention.
Figure 11:
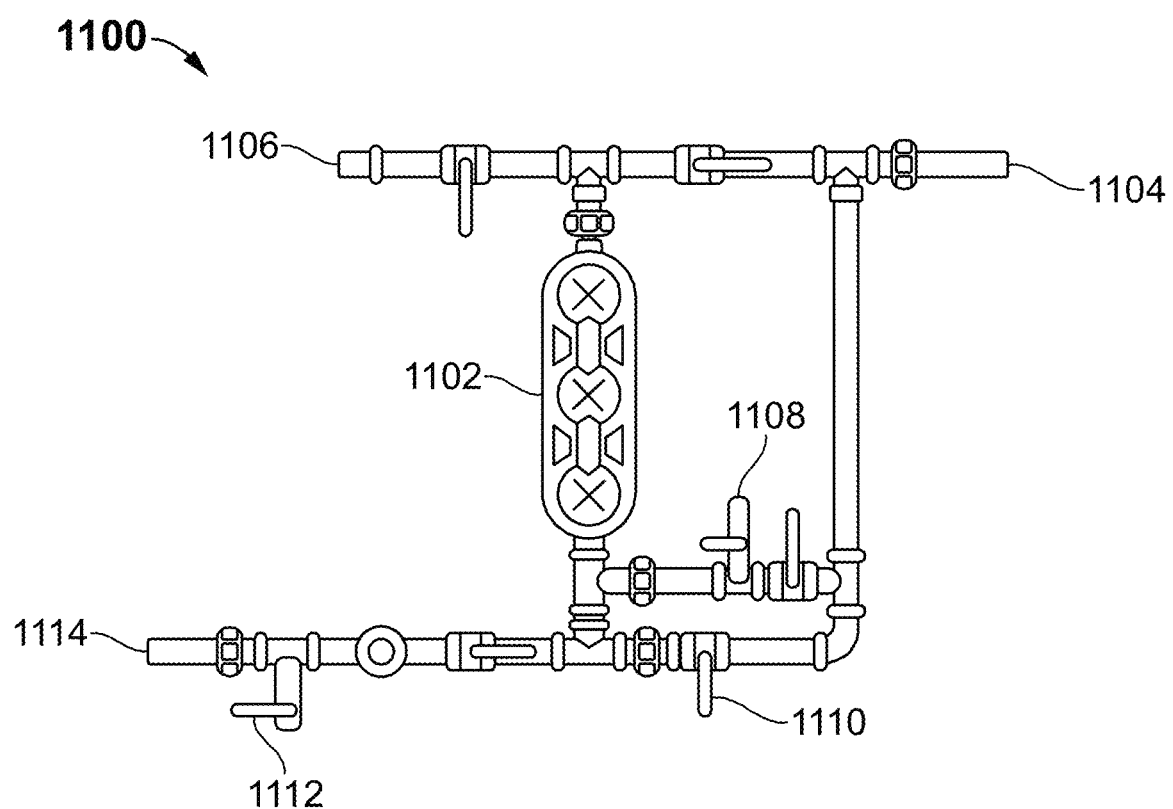
FIG. 11 exemplarily illustrates a top view of a water hardness removal system, according to an embodiment of the present invention, and FIG. 12 exemplarity illustrates a top perspective view of the water hardness removal system, according to an embodiment of the present invention.
Figure 12:
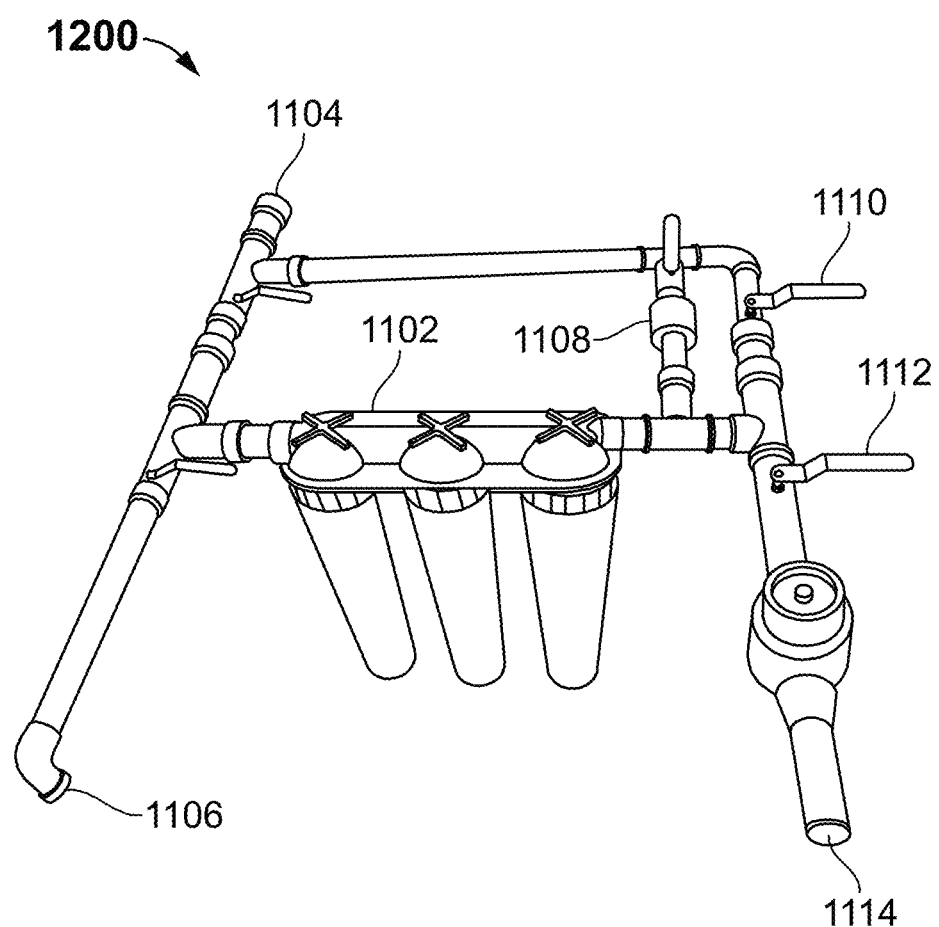

In order to determine the efficiency of water hardness removal (calcium and magnesium), the simple procedure based on the batch experiments are carried out. The laboratory set up having three columns with the tubing set (as shown in FIGS. 11 and 12) to run them concurrently as well as separately. In one embodiment, the laboratory work up uses one column as shown in FIG. 2. In some embodiments, more than one column could be used corresponding to the applied water flow rate. The sample of about 10 g of the prepared nanocomposite in hydrogen form is put into the basket 204 of the resin, wherein the appearance of single basket utilized for water hardness removal 200 is shown in FIG. 2.

Before insertion of nanocomposite in the basket 204, the prepared nanocomposite is washed three times to remove or reduce the possible organic and inorganic impurities with the solution of 1M HCl and 1M NaOH, respectively. The nanocomposite is flushed with 1M HCl in a fixed bed to convert H+ form from Na+ and the obtained nanocomposite is then washed with deionized water. The nanocomposite in H+ form is finally washed with bi-distilled water and used throughout the experiments. Further, the basket 204 equipped with a mechanical stirrer 206 and is placed into a transparent polycarbonate vessel 202 of the reaction containing the stock solution in the volume of 1.0 liter. The stirrer 206 with a constant speed is applied to the stock solution for 1 h. To measure the concentration of calcium and magnesium ions in the stock solution using the equations of the calibration curve, the samples of 0.5 ml (500 µl) from the stock solution are taken for a total time of 60 min with an interval time of 10 min while the stirrer 206 is stopped. For analysis, the obtained samples for each time (10 min) are diluted and acidified with the solution of nitric acid. The residual concentrations of calcium and magnesium ions are determined by an atomic absorption spectrophotometer with a model of Perkin Elmer and air acetylene flame. The balance of the model of Sartorius AG (BL2105) is used for all weights. The instrumental parameters such as wavelength (nm), slit width (nm) and lamp current (mA) are 442.67 (nm), 2.7 (nm) and 20 (mA), respectively. It is mentioned that the Optimum working range for both of calcium and magnesium is 0.2-2.5 mg/L.

As a comparative study, the commercial resin of Amberlite IR 120 [Na+] having copolymer of styrene and divinylbenzene with functional groups of SO3-Na+ in the physical form gel type as a strongly acid cation exchanger is used. It is noted that the same procedure is used for this resin before its use in water hardness removal. For regeneration of the applied nanocomposite and also commercial resin, the NaOH of about 6% (w/v) solution and the HCl of about 5% (v/v) is used. The initial pH of the solution of hard water is controlled with pH meter by adding solutions of hydrochloric acid and sodium hydroxide for pH study as an operational factor in water hardness removal.

Example-7: Antibacterial Study

Taking the previous experiments (briefly, instructions are described for all of the applied antibacterial test methods that are used in this study), the Kirby-Bauer method based on the agar well diffusion, micro-plate dilution method by determining the minimal inhibitory concentration (MIC) and the minimal bactericidal concentration (MBC) based on the 3-(4,5-dimethylthiazol-2-yl)-2,5-diphenyl tetrazolium bromide (MTT) method are accomplished for clinical isolation of *Staphylococcus aureus* ATCC 25923 (from Gram-positive) and *Escherichia coli* ATCC 25922 (from Gram-negative) bacteria. Based on the obtained results from agar well diffusion and micro-plate dilution method, the membrane permeability evaluation based on the level of extracellular lactate dehydrogenase (LDH) enzyme release, and oxidative stress examination based on reactive oxygen species (ROS) generation with fluorescent probe 2',7'-dichlorofluorescein diacetate (DCFH-DA) are also performed. The level of extracellular lactate dehydrogenase (LDH) enzyme release acts as an indicator of membrane permeability. Further, the fluorescent probe 2',7'-dichlorofluorescein diacetate (DCFH-DA) is oxidized to 2'-7'-dichlorofluorescein (DCF) during the antibacterial examination.

In order to study the morphology of bacteria before and after antibacterial treatment to confirm the antibacterial role of Ag nanoparticles in the prepared nanocomposite, transmission electron microscopy (TEM) method is applied for *Escherichia coli*. The procedure for TEM analysis (by ZEISS 10A instrument) is as follows: The bacterial suspension is centrifuged and resulting pellet is fixed with 2.5% glutaraldehyde in 0.1 cacodylate buffer (pH=7.2) (mol/L) at refrigerator for overnight. The fixed pelleted content is then post-fixed in 1% osmium tetroxide and cacodylate buffer for 2 hours at laboratory condition. Dehydration is carried out in graded series of ethanol of 40%-95% dilutions for 15 min and finally in 100% ethanol. The dehydrated post fixed samples are embedded in the Epoxy resin at 45° C. and an ultra-thin section is prepared by an ultra-microtome instrument.

Example-8: Enrichment of SRBs Biofilm and Biofilm Inhibition Studies

The mixed culture SRBs used in this study is enriched based Postage's C medium, which is used to prepare the active SRBs cultures (Postgate, 1984) in simulated inject seawater. The pH of the medium is initially adjusted to approximately 7.5 with a 1N NaOH solution and is heat-sterilized at 15 psi pressure and 120° C. for a period of 20 min. A high purity nitrogen gas is purged through the medium to maintain anaerobic conditions before inoculation. The culture is maintained in 1 L bottles at 35° C. on a rotary shaker at 110 rpm. The developed culture is further sub-cultured every week under anaerobic conditions for several months. Sulfate reduction and sulfide production are indicated through blackening of the media.

Batch analyzes are performed in 250 mL glass vessels of Postgate C media prepared in synthetic seawater. Sodium sulfate and sodium lactate are used as the sulfate and carbon sources, respectively. The reactors are seeded with enriched mixed SRBs biofilm to make volatile suspended solids (VSS) concentration of 1000 mg/L. In order to examine the effect of synthesized nanocomposite on the activity of SRBs, the inhibition effect of nanocomposite with different silver loadings are examined based on the sulfate reduction, organic substance oxidation and sulfide production. To observe the effect of nanocomposite on SRBs biomass, the batch assays are exposed to 30, 60, 90, 120, and 240 μg/mL silver concentrations with sulfate and TOC concentrations of 1000 and 650 mg/L, respectively. A high purity nitrogen gas is purged through the medium to maintain anaerobic conditions before inoculation. The reactors are exposed to continuous shaking at 110 rpm and constant mesophilic temperature of 35° C. Aliquots are withdrawn at specific time intervals and centrifuged at 10,000 rpm for 10 min. The supernatant is used for further analysis. Dissolved sulfide is analyzed by a titrimetric method using the standard examination methods of water and wastewater as described earlier. Concentration of sulfate is analyzed by a DX ICS-5000 ion chromatography (IC) unit (Dionex, USA). Abiotic controls consisted of the sterile seawater and nanocomposite medium without the inoculum. All experiments are performed in triplicate and average values are recorded.

Example-9: Effect of the Hydrogel Nanocomposite

A synergistic effect of stronger and flexible network with the COO⁻ groups and formation of electro statistic repellent due to the existence of similar charges on network polymeric chain and NaY zeolite with high adsorption capacity, high cation exchange capacity, high surface area lead to good swelling, high adsorption capacity, high cation exchange capacity and mechanical strength of hydrogel nanocomposite in high pressure that has excellent filtration performance even in the case of large scale production. The present invention is very desirable for industrial practice.

The main problems in industries to produce soft water with water hardness removal filter cartridge is backwash that is carried out for a short time after the usage, which leads to the reduction of ion exchange and adsorption capacity, and this problem is not economical. The water filter cartridge of the present invention has reduced fluctuation infiltration flow rate and infiltration performance due to a unique combination of polymer and zeolite and silver nanoparticles. The water filter cartridge has stable performance even in the case of large-scale production. Furthermore, the water purifier of the present invention is equipped with water filter cartridge as a simple and available equipment.

According to the present invention, the hydrogel nanocomposite could be well carried out even to the inside of the particles with good swelling particles and high mechanical strength due to the existence of zeolite and silver nanoparticle in polymer matrix, Also, a cation exchange resin having a high ion exchange capacity could be obtained. Furthermore, since the polymer hydrogel nanocomposites are prepared with a simple manner without essential equipment, the process of the present invention is very desirable for industrial practice. The obtained hydrogel nanocomposite with high ion exchange capacity has stable performance for a long time and after several times without backwash. Backwash could be well carried out after a long-time usage of hydrogel nanocomposite due to synergistic effect of polymer structure and zeolite (NaY zeolite nanoparticles).

Microemulsion as a soft template and as a candidate method to produce the nanocomposite has many advantages include good particle size shape and mono-dispersity controlling. Further, the microemulsion method have many advantages include, but not limited to, the following: (i) eliminating the need to yearly acid washing, (ii) increasing the system's lifetime, (iii) preventing water from changing to acid, (iv) keeping the pH value of water in neutral, (v) decreasing the maintenance and repairing expenses, (vi) preventing any kind of sediment and alga from being formed in the system, (vii) transferring heat easily due to the existence of no sediments (after producing soft water for industrial use), (viii) decreasing the expenses of fuel and energy usage, (ix) vanishing and eradicating the current sediments inside the system without need to empty the system, and (x) More powerful from ion exchange resins corresponded to standard index.

The method is unique and incomparable for water hardness removal in order to prevent any kind of sediments, rust and corrosion (due to antibacterial activity of the nanocomposite for degradation of sulfate-reducing bacteria (SRB)), from being formed in all kinds of cooling and heating systems. Microemulsion is works under pressures up to 20 atmospheres due to usage of zeolite nanoparticle and engineering structure of the prepared nanocomposite. The degree of water hardness (total dispersion solid TDS) and amount floating particles in water like salt, calcium, etc. does not affect the performance of the formulation, composition and stability of the prepared nanocomposite. The usage of the prepared nanocomposite in this invention for controlling water hardness removal leads to the all industrial systems and equipment include boilers, cooling towers, chillers work with any pressures atmospheres.

The excellent antibacterial/microbial activity (due to usage of silver nanoparticles with low dosage) for all of kinds of microorganisms includes gram-negative or positive bacteria and also sulfate-reducing bacteria which play important role in causing corrosions. The prepared nanocomposite shows various highly stable behaviors in all kind of condition particularly in high salt concentration on inject water. The inhibition of SRBs activity is concentration-independence. It is expected that the synergistic nanocomposite (water hardness removal and antibacterial activity) could contribute to the development of "green" nanocomposite or biocides for all kind of industrials including oil/gas industries which will be eco-friendly and will have no adverse impact to the environment.

The resulted nanocomposite is characterized with different techniques such as Fourier-transform infrared spectroscopy (FT-IR), X-ray diffraction (XRD), scanning electron microscopy (SEM), transmission electron microscopy (TEM) and X-ray photoelectron microscopy (XPS).

Example-10: Fourier-Transform Infrared Spectroscopy (FT-IR)

Figure 3:
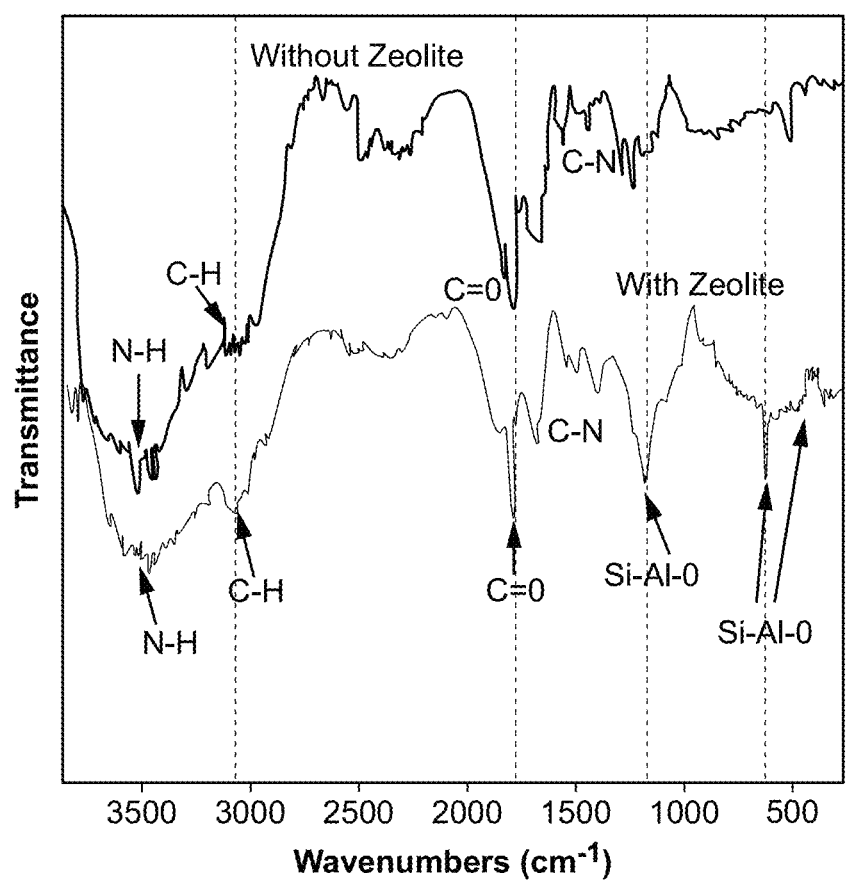
FIG. 3 exemplarily illustrates FTIR spectrum of polymer nanocomposite hydrogel with and without NaY zeolite.

The FTIR spectra of prepared polymer/zeolite-Ag nanocomposite hydrogel and nanocomposite hydrogel without zeolite are shown in FIG. 3, wherein both the spectra show a broad absorption band at 3000-3440 $cm^{-1}$ corresponding to OH group and NH group of polyacrylamides. The peak at 1700 $cm^{-1}$ represents carbonyl stretching vibration (C=O) of poly AAm (acrylamide) and poly MMA (methyl methacrylate) and shifted to 1695 $cm^{-1}$ upon polymerization and preparation of polymer nanocomposite when pure polymer changed to a polymer containing zeolite composite. This shifting is related to the interaction between the carbonyl group and surface of the zeolite.

An ester carbonyl stretching vibration band and C—H stretching in C—CH$_3$ for the polymer such as poly MMA, poly AAm and poly AAc segments are observed around 1714 cm$^{-1}$ and 2957 cm$^{-1}$. The peak at 1710 cm$^{-1}$ is related to the carbonyl group of polyacrylate, which is assigned to C=O stretching of carboxylate and could be found from the shoulder peak upon polymerization. The peaks at 1800 cm$^{-1}$ in both spectra are assigned to NH$_2$ scissors of amides (AAm). The peak at 1520 cm$^{-1}$ is corresponding to C—C of aromatic ring modes. Furthermore, the peaks at 1460 cm$^{-1}$ in both spectra are assigned to C—N stretching vibration of amides. It is noted from the graph that two medium intensity bands at 1359 cm$^{-1}$ and 1284 cm$^{-1}$ are assigned to CH$_2$ wagging vibration from MBA monomer and polymer, respectively. The stretching vibrations of ester group peak at 1200 cm$^{-1}$ is assigned to C—C—O, which disappears in the polymer containing zeolite nanocomposite. Three peaks at 1324 cm$^{-1}$, 1300 cm$^{-1}$ and 1163 cm$^{-1}$ are related to the C—C—C stretching in polymer formulation without zeolite. The three peaks are disappeared in polymer nanocomposite containing zeolite due to (a) the disappearance of C—C—C stretching peaks is an evidence of the grafting and cross-linking in polymer nanocomposite and (b) the interaction between the polymer and surface of zeolite in nanocomposite hydrogel. Also, it is found from the graph that the two bonds at 1384 cm$^{-1}$ and 1570 cm$^{-1}$ are related to COO— group in polyacrylate and the peaks at 1456 cm$^{-1}$ and 2953 cm$^{-1}$ represent the C—N and C—H bonding, respectively. As it is found that the peaks of carbonyl shifted to around 1700 cm$^{-1}$ in the spectrum of polymer nanocomposite with zeolite, the intensity of the peaks at 3398 cm$^{-1}$ correspond to N—H also decreased and shifted to a lower frequency. Hence, the formation of hydrogen bonding is between COOH, NH$_2$ of the copolymer and hydroxyl groups of Al—OH and Si—OH in the zeolite. In addition, two bands at about 1120 cm$^{-1}$ due to Si—O and 500 cm$^{-1}$ are related to Al—OH in the zeolite structure in polymer matrix. This observation confirms that the Ag nanoparticles are incorporated into the zeolite and polymer backbone.

Example-11: X-Ray Diffraction (XRD) Analysis

Figure 4:
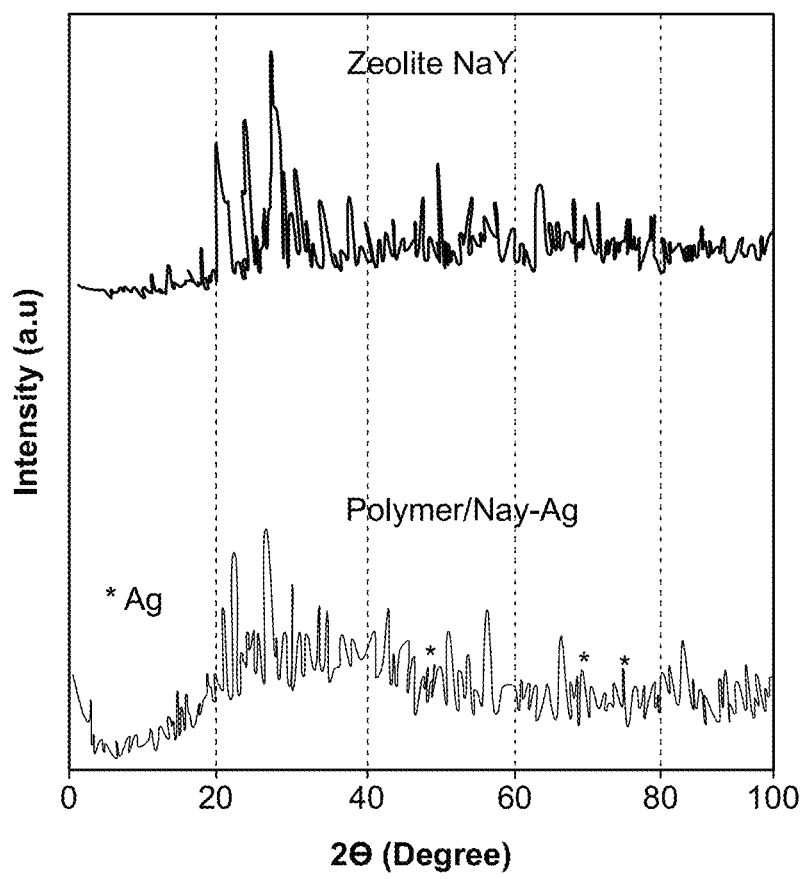
FIG. 4 exemplarily illustrates XRD patterns of NaY zeolite and polymer/zeolite-Ag nanocomposite hydrogel.

Referring to FIG. 4, the XRD diffractogram of commercial NaY zeolite and the fabricated polymer/zeolite-Ag nanocomposite hydrogel, are disclosed. From the XRD pattern of NaY zeolite, some diffraction peaks at a wide range of angle like 2θ=20-80 are shown and are indexed as the NaY phase. To confirm the characteristic diffraction peaks of used NaY (zeolite Y), the XRD pattern is compared with the XRD data in the standard reference source and JCPDS No. 00-038-0240. The chief XRD reflections for zeolite Y centered at appear at around 2θ=6.27°, 10.20°, 11.95°, 15.71°, 18.74°, 20.40°, 23.68° and 27.07° (corresponded to (111), (220), (311), (331), (333), (440), (533), and (642) crystal planes respectively). The XRD pattern of the prepared polymer/zeolite-Ag nanocomposite hydrogel shows that the intensity of the diffraction peaks of the zeolite are slightly decreased due to the covering particles with polymer. Two broad peaks at 2θ: 12.3 and 20 could be observed due to poly (AAm-co-AAc). The XRD pattern for the polymer/zeolite-Ag nanocomposite hydrogel indicates the formation of synthesized Ag nanoparticle as a crystalline structure. Based on the XRD pattern for the polymer/zeolite-Ag nanocomposite hydrogel, four relatively weak diffraction peaks attributed to Bragg's reflections of the (111), (200), (220) and (311) planes of the face center cubic structure of silver particles are observed that appeared at around 38.21°, 44.41°, 64.61° and 77.51°, respectively.

Example-12: SEM, TEM Micrographs and DLS Analysis

Figure 5A:
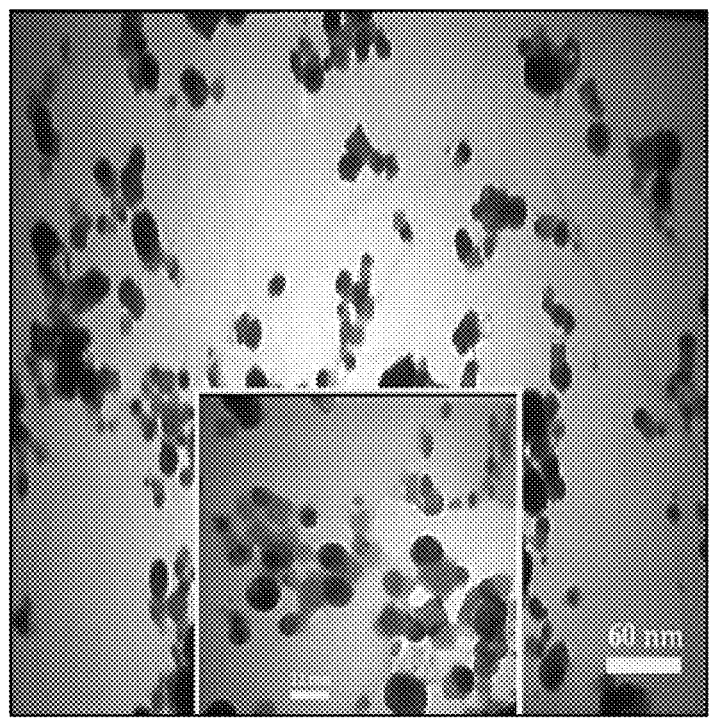
FIG. 5A exemplarily illustrates dynamic light scattering (DLS) result for Ag nanocolloid system.
Figure 5B:
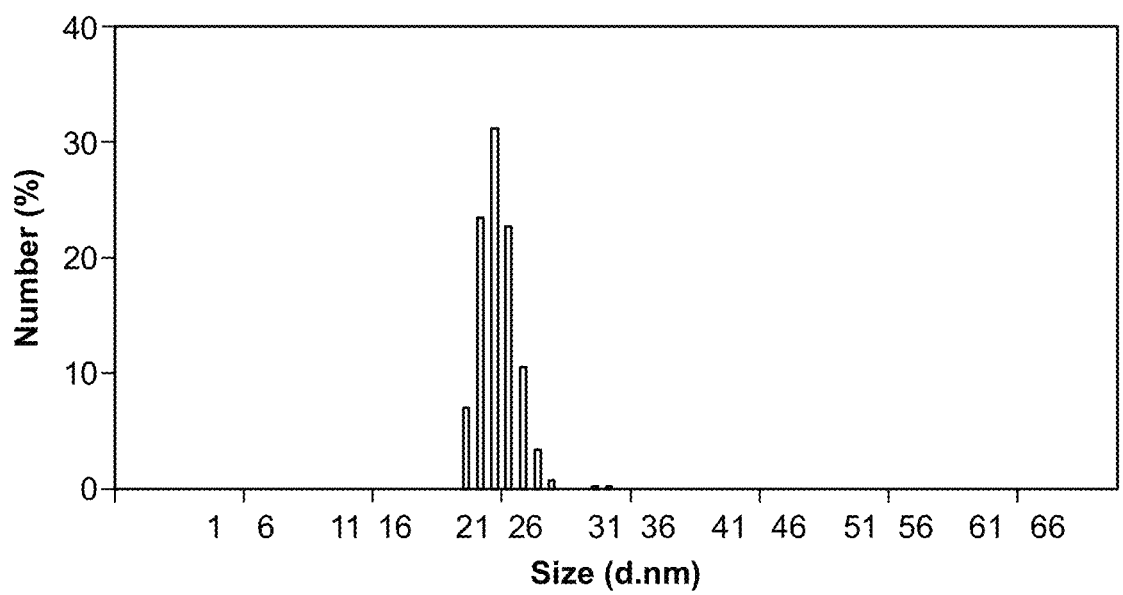
FIG. 5B exemplarily illustrates TEM micrograph of Ag colloid.

A dynamic light scattering (DLS) is employed to agitate the formation of Ag nanoparticles by water-in-oil microemulsion system, to clarify the stability and monodispersity of nanoparticles as key and beneficial factors for their applicability. FIG. 5A shows a typical DLS result of Ag nanoparticles as the particle number distribution, where the size of suspended metal nanoparticles is in the range of about 1 nm-2 nm. FIG. 5B discloses a TEM analysis on the spherical particles, which has good monodispersity for Ag nanoparticles in w/o microemulsion system.

Figure 5C:
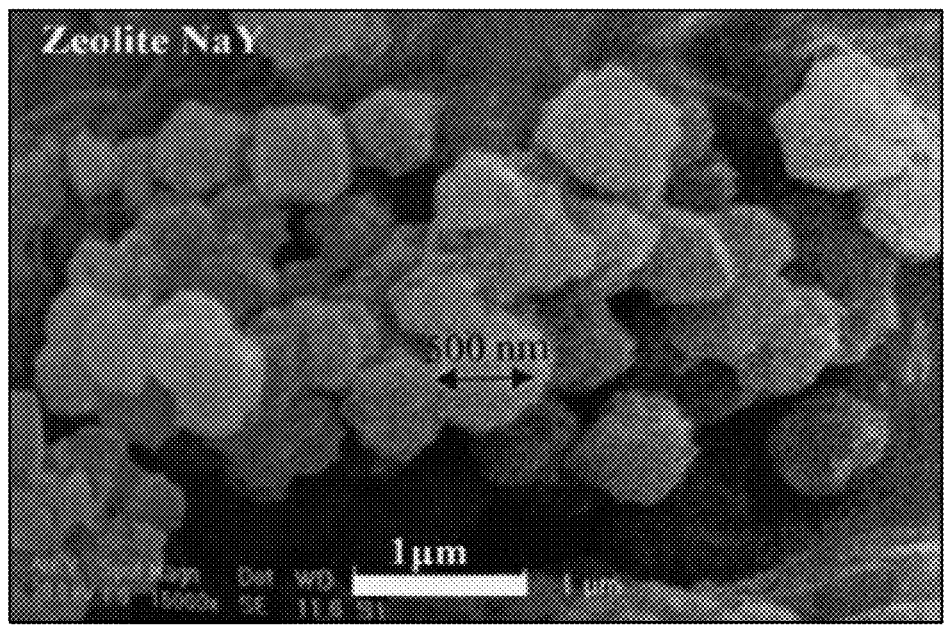
FIG. 5C exemplarily illustrates SEM micrograph of NaY nanocomposite.
Figure 5D:
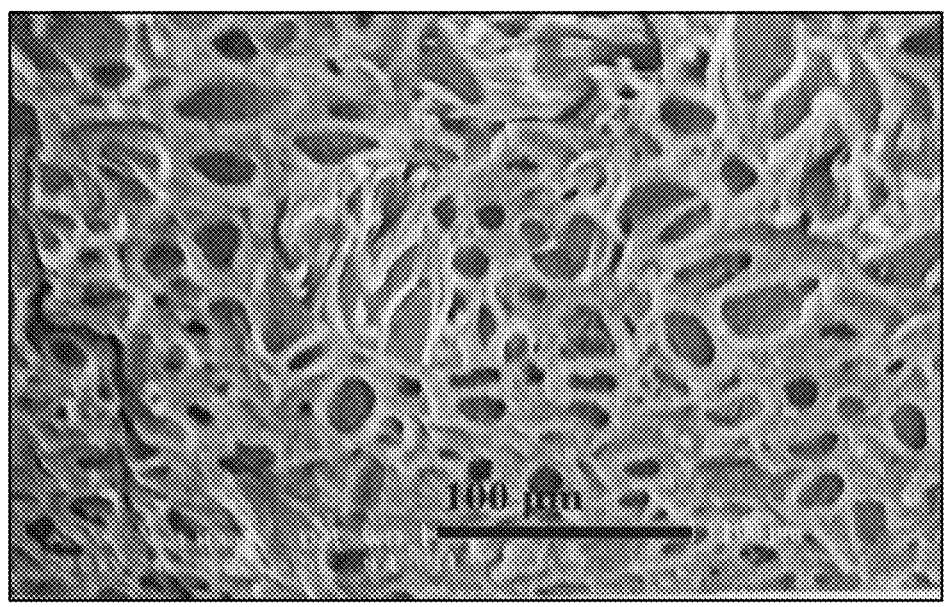
FIG. 5D exemplarily illustrates SEM micrograph of polymer/zeolite-Ag nanocomposite hydrogel with internal structures.
Figure 5E:
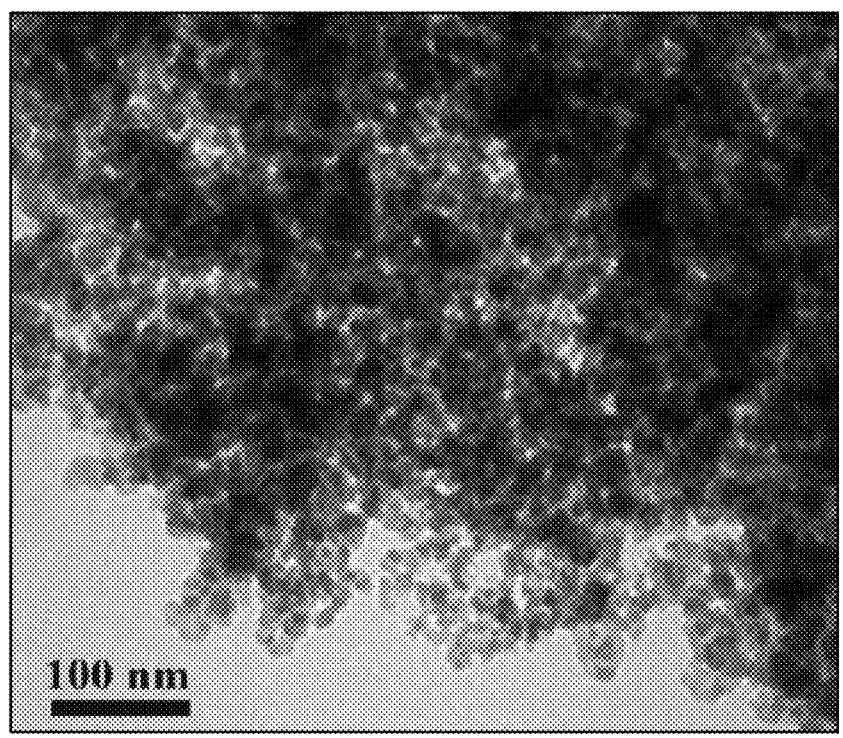
FIG. 5E exemplarily illustrates TEM image of polymer/zeolite-Ag nanocomposite hydrogel.

FIGS. 5C and 5D disclose SEM images of NAY zeolite and the prepared polymer/zeolite-Ag nanocomposite hydrogel with the internal structures. The SEM micrograph of zeolite exhibits a uniform morphology with an average size of about 300-500 nm, as shown in FIG. 5C. The resulting internal structures with open network structures and an extensive interconnection among pores are depicted in FIG. 5D, wherein the thicker pore walls display a homogeneous network of pores. It is noted that the composition and cross-link density of network polymeric chains could control the pore interconnections, pores volume fraction and pore sizes in nanocomposite hydrogel structure. From SEM micrograph, it is found that the NaY zeolite particles and Ag nanoparticles are homogeneously dispersed in the polymer network. This result indicates that Ag nanoparticles and zeolite particles are not aggregate. The zone areas show the fine network structure with good monodispersity and uniform particle size. Hence, it is clear that the Ag nanoparticles and NaY zeolite have good collaboration with polymer network and improves the cross-linked structure of it, which may be favorable for several applications in water hardness removal and also waste water treatment. Further, a TEM image of the prepared nanocomposite hydrogel is shown in FIG. 5E. The TEM image clearly exhibits the Ag nanoparticles decorated in the zeolite framework and the distributed nanoparticles having a spherical shape are identified.

Example-13: X-ray Photoelectron Spectroscopy (XPS) Analysis

Figure 6:
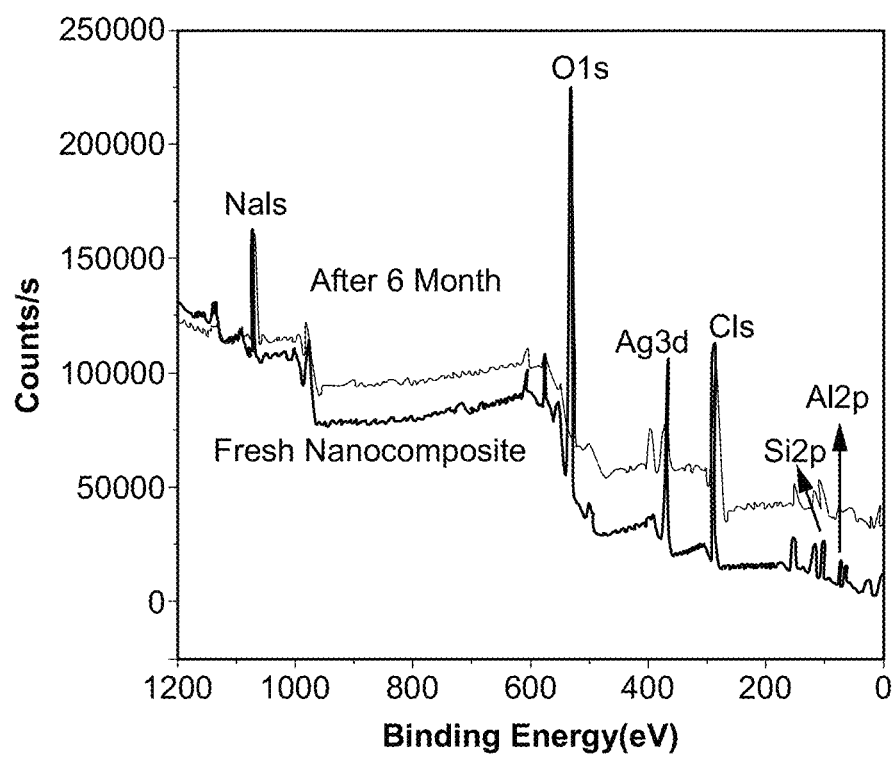
FIG. 6 exemplarily illustrates an XPS spectra of fresh polymer/zeolite-Ag nanocomposite and applied nanocomposite after several months.

Referring to FIG. 6, the XPS analysis is used to analyze and confirm the existence of the zeolite particles, Ag nanoparticles and also valance state of Ag in prepared polymer/zeolite-Ag nanocomposite hydrogel. It is clearly confirmed from FIG. 4 that the prepared nanocomposite is chiefly composed of Al, Si, Na, O, C and Ag elements. Based on the high-resolution XPS spectra, two peaks at binding energy of 368.25 and 374.26 eV related to Ag $3d_{5/2}$ and Ag $3d_{3/2}$, respectively, which originates from Ag(0), suggest the formation of metallic silver Ag(0) on the surface of zeolite in prepared nanocomposite, and no peak exist corresponding to lattice oxygen $O^{-2}$ from Ag$_2$O. As shown in high-resolution XPS analysis of FIG. 6, Beamson and Briggs are showing a three-peak including aliphatic hydrocarbon, an ester oxygen-induced beta-shifted carbon, and the carboxylic acid carbon fitting scheme gives an adequate description of the C 1s spectrum of poly AAc with a binding energy of 285.0 eV.

Figure 7A:
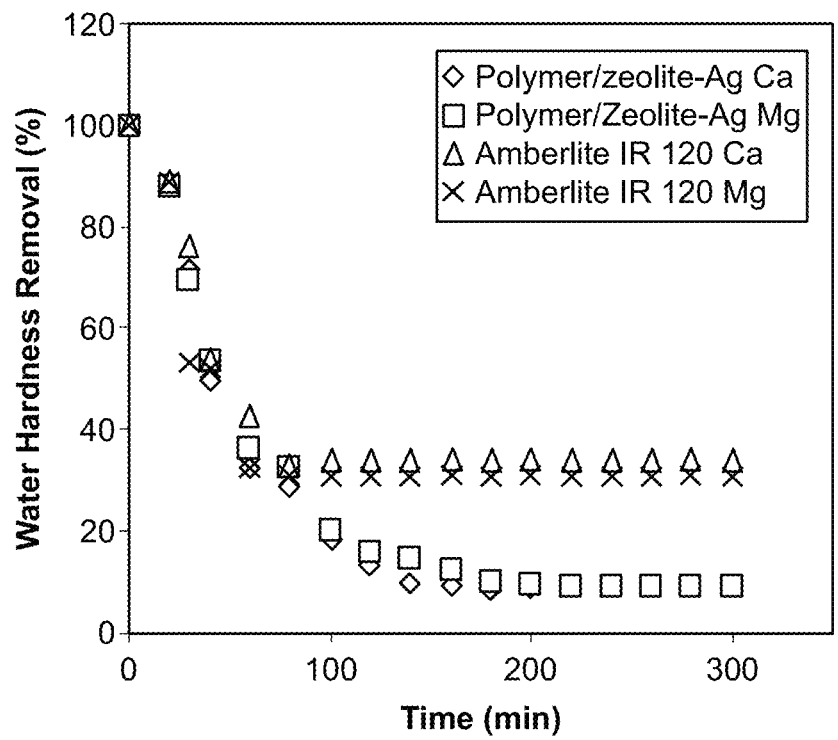
FIG. 7A exemplarily illustrates the water hardness removal (Ca and Mg) with initial hardness of 200 and 220 respectively, as a function of initial self pH of the solution.
Figure 7B:
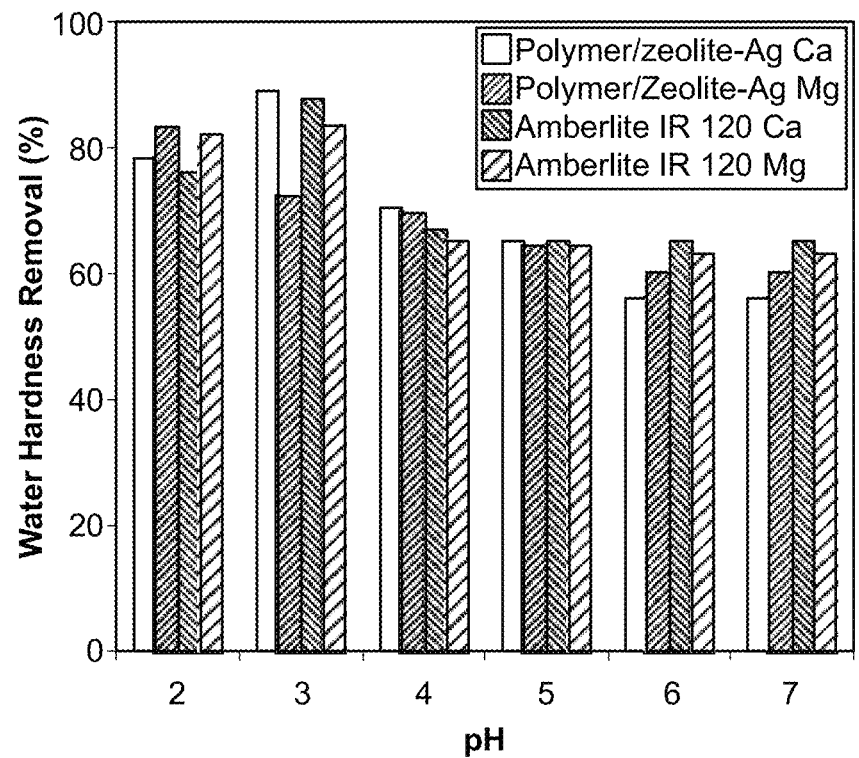
FIG. 7B exemplarily illustrates one or more experimental conditions depend on effect of pH for removal of hardness of Ca and Mg with initial hardness of 200 and 220, respectively, and stirring speed of 120 rpm.

Example-14: Results on Water Hardness Removal—Effect of pH on the Water Hardness Removal Referring to FIGS. 7A and 7B, the pH of the stock solution as a significant effect on affinity of the resin and nanocomposite for Ca(II) and Mg(II) ions, is examined while the amount of resin, temperature, stirring speed, and maximum contact time are kept constant at 10 g, 298 K, 120 rpm, and 60 min, respectively. The initial pH range between 2 and 5 is selected and controlled with pH meter by adding solutions of hydrochloric acid and sodium hydroxide for the sorption of Ca and Mg ions and subsequently the water hardness removal from the stock solution with the resin of Amberlite IR 120 [$H^+$] and the prepared nanocomposite. FIG. 7A discloses the water hardness removal for the resin and the prepared nanocomposite at the initial self pH. From FIG. 7A, as a primary comparative study the prepared nanocomposite has remarkable performance in water hardness removal from stock solution in contrast of the commercial resin in the same condition. FIG. 7B shows the amount of removing the hardness of Ca(II) and Mg(II) ions depends on the contact time with resin and sample of nanocomposite phase in the adjusted pH range. The behavior of nanocomposite is similar for sorption and exchange capacity of Ca(II) and Mg(II) ions in stock solution. For the resin of Amberlite IR 120 [$H^+$], the exchange capacity is higher for Mg(II) ions and the sorption phenomenon is more selective for Ca(II) than Mg(II) ions. Based on the obtained results, the removal amount of Ca(II) and Mg(II) ions has remarkably increased from ~35% in initial self pH to ~80%-90% after pH adjusting for both of samples.

Referring to FIG. 7B, the maximum uptake capacity and amount removal for Ca and Mg for the equilibrium of 30 min, is more responsible up to about 86% (68 mg/g) at pH=3 and 78.3% (64.32 mg/g) at pH=2, respectively. This result shows that the prepared nanocomposite and the resin have a higher capacity of uptake and selectivity for adsorption of Ca and Mg in pH range between 2 and 3. This could be due to the adsorption of Ca(II) and Mg(II) ions with anionic functional groups on the surface of the prepared nanocomposite and applied resin. The nanocomposite has the same priority for Ca(II) and Mg(II) sorption with more number of binding sites. FIG. 7B shows, the experimental conditions concerned with effect of pH for water hardness removal at different pH values of stock solution.

Example-15: Effect of Amount of the Resin and Prepared Nanocomposite on the Removal of Water Hardness The removal amount of hardness of Ca and Mg from stock solutions in relation to the amount of the prepared nanocomposite and the commercial resin of Amberlite IR 120 [$Na^+$] between 3 g and 15 g is examined. The experimental conditions such as pH and the stirrer speed of the stock solution are 3.0 rpm and 115 rpm, respectively. The results are listed in Table 1, which shows that the removal efficiency of water hardness increases with a rising amount of the applied resin and nanocomposite for a fixed initial concentration of Ca and Mg in the stock solution of hard water. This phenomenon shows that the amount of the resin and nanocomposite provides a great of ion exchange sites to replace of earth alkaline metals in synthetic hard water. The amount of the resin is an important parameter to obtain the quantitative uptake of calcium and magnesium ions. Table 1 shows the experimental conditions depend on effect of amount of the resin for removal of hardness of calcium and magnesium with initial hardness of 200 and 220, respectively at 298 K and stirring speed of 120 rpm.

TABLE 1

Effect of amount of the resin for removal of hardness of calcium and magnesium

| pH | Resin dosage (g) | Hardness of Ca in equilibrium (1) | (2) | Hardness of Mg in Equilibrium (1) | (2) |
|---|---|---|---|---|---|
| 3 | 15 | 18 | 55.43 | 20 | 30 |
| 3 | 10 | 16.15 | 57 | 25.23 | 33.40 |
| 3 | 5 | 20.15 | 87.33 | 31 | 43.39 |
| 3 | 3 | 28 | 60 | 28 | 60 |

(1) The Commercial resin of Amberlite IR 120[$Na^+$]
(2) The prepared nanocomposite in lab Example-16: Effect of Stirring Speed on the Water Hardness Removal The effect of stirring speed on the removal of hardness of Ca and Mg ions is examined for the prepared nanocomposite hydrogel and commercial resin for Amberlite IR 120 [$Na^+$]. The examination is performed under the same condition of solution pH of 3 with the resin and nanocomposite amount of 10 g, wherein the agitation speed is adjusted between 100 rpm and 200 rpm. The results are shown in Table 2, with the experimental conditions concerned with the effect of stirring speed in the removal amount of hardness. According to the obtained results, it is clear that while stirring speed of the stock solution increases the water hardness is reduced, which indicates that the stirring speed of stock solution has an impact on adsorption of Ca and Mg and consequently removal of hardness degrees. Table 2 shows the experimental conditions depend on the effect of stirring speed for removal of hardness of Ca and Mg with an initial hardness of 200 and 220, respectively at 298 K, resin dosage of 10 g.

TABLE 2

Effect of stirring speed for removal of hardness of Ca and Mg

| pH | Stirring speed (RPM) | Hardness of Ca In equilibrium (1) | (1) | The hardness of Mg in equilibrium (1) | (2) |
|---|---|---|---|---|---|
| 3 | 200 | 20.15 | 87.33 | 31 | 43.39 |
| 3 | 150 | 28.15 | | 35 | 47 |
| 3 | 120 | 30 | | 44.24 | 38.20 |
| 3 | 100 | 30 | | 46 | 39 |

Figure 8A:
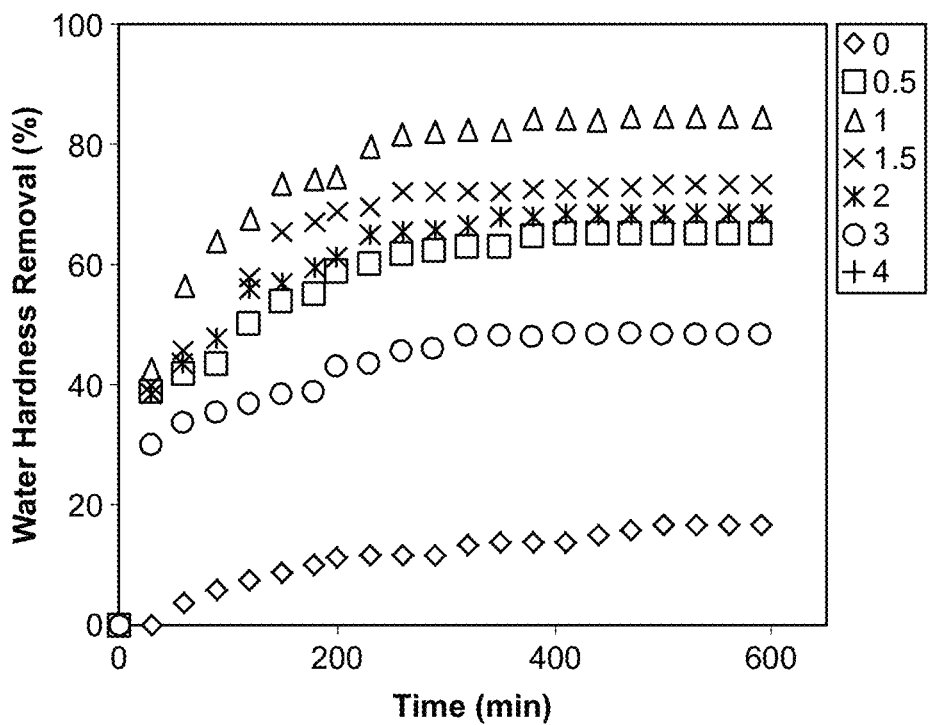
FIG. 8A exemplarily illustrates the molar compositions effect of N,N'-methylene bisacrylamide.

Example-17: Effect of N,N'-methylene bisacrylamide (MBA) Molar Compositions on the Water Hardness Removal Referring to FIG. 8A, the effect of different compositions of N,N'-methylene bisacrylamide (MBA) on water hardness removal with respect to time, is disclosed. When the amount of N,N'-methylene bisacrylamide increased from 0.5 to 2, the water hardness removal is noticeably decreased. This phenomenon is due to the formation of more branches on the network with more increase in the amount of MBA crosslinking agent. The increase in MBA crosslinking agent decreases the free volume for Ca and Mg ions diffusion and as a result, the water hardness removal decreased. It is clear that the increasing of bisacrylamide led to a stronger but less flexible network.

Figure 8B:
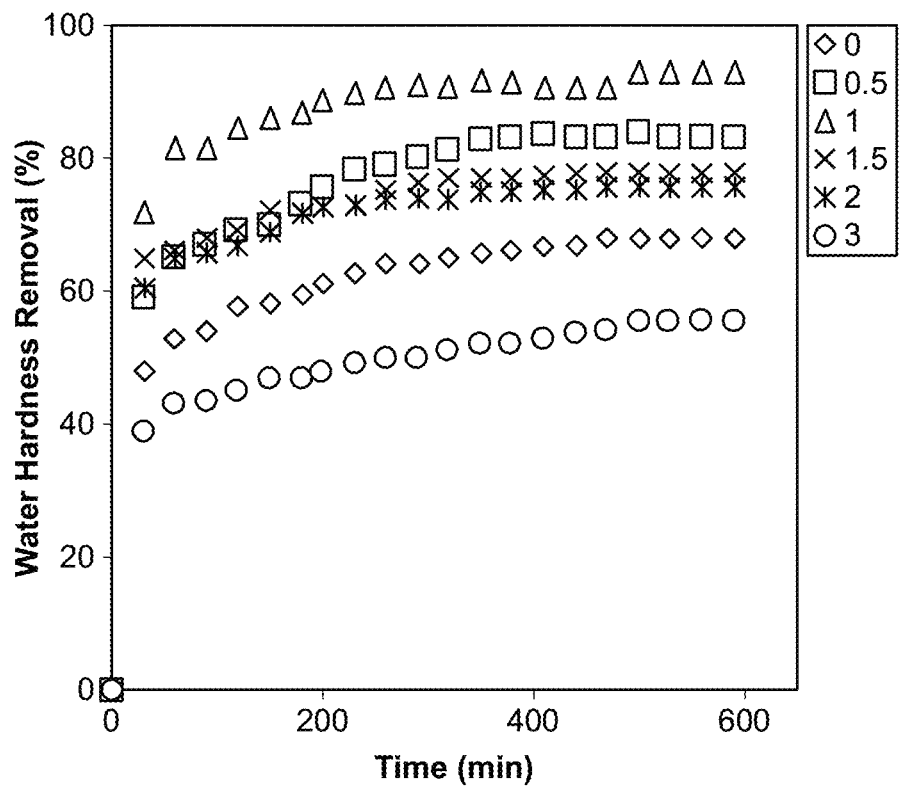
FIG. 8B exemplarily illustrates removal of hardness of Ca and Mg with initial hardness of 200 and 220, respectively using acrylic acid.

Example-18: Effect of Acrylic Acid Molar Compositions on the Water Hardness Removal Referring to FIG. 8B, the effect of acrylic acid compositions on water hardness removal versus time is disclosed. The amount of water hardness removal increases when the amount of acrylic acid increases to about 2%. It shows that the reason for this phenomenon is due to the increase of COO— groups in the polymer network. As a result, the formation of electro statistic repellent due to the existence of similar charges on network polymeric chain leads to less application of the prepared polymer/zeolite-Ag nanocomposite to adsorption of Ca and Ma ions. Based on the obtained results, the acrylic acid composition of 2% is selected in this examination due to its maximum capacity for water hardness removal.

Example-19: Antibacterial Study

According to Table 3, it shows the determined zones of inhibition, MIC and MBC values toward clinical isolates (*Staphylococcus aureus* and *Escherichia coli*) in the presence of polymer/zeolite nanocomposite without Ag nanoparticles, polymer/zeolite-Ag nanocomposite, Ag colloid, and the control sample is evaluated based on the Kirby-Bauer and MTT methods. From the obtained results, it is found that polymer/zeolite-Ag nanocomposite exhibits a higher antibacterial activity against all tested bacteria than polymer/zeolite nanocomposite without Ag nanoparticles but shows the similar performance related to the Ag colloid. Also, the polymer/zeolite nanocomposite has a minor antibacterial activity against *Staphylococcus aureus* in contrast of other samples. This behavior is possibly due to the existence of anionic functional groups on the surface of the prepared polymer/zeolite nanocomposite. Consequently, the electrostatic adherence between the negatively charged polymer molecule and the positively charged bacteria cell membrane could affect the membrane permeability, disturb internal osmotic imbalances, and lead to microbial growth inhibition, thus results in the cell death. In addition, it is found that the polymer matrix, which protects the Ag nanoparticles, has no adverse effect on the antibacterial activity of Ag in the prepared polymer/zeolite-Ag nanocomposite. Table 3 shows the zone of inhibition, MIC and MBC results toward *Staphylococcus aureus* and *Escherichia coli* bacteria with Sample 1: polymer/zeolite nanocomposite, sample 2: polymer/zeolite-Ag nanocomposite and sample 3: Ag colloid.

In order to verify the disk diffusion method, the microplate diffusion method is used and the results are reported in Table 3. From the results, it is obtained that the antibacterial activity of the polymer/zeolite-Ag nanocomposite is same as Ag colloid and better than polymer/zeolite nanocomposite due to the bacterial effect of Ag nanoparticles. For additional verification, the morphological change of the *Escherichia coli* as a model bacterium is exposed to the polymer/zeolite-Ag nanocomposite, which is evaluated with TEM technique based on the obtained results from disk diffusion and microplate dilution methods that the polymer/zeolite-Ag nanocomposite reveals the best antibacterial activity.

Figure 9A:
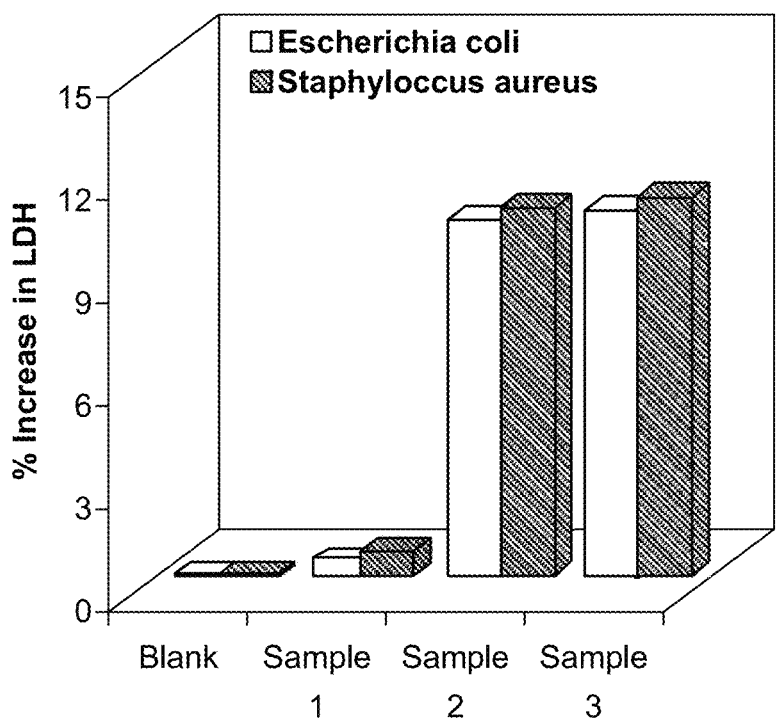
FIG. 9A exemplarily illustrates cell permeability exemplified by LDH quantification.

Furthermore, the release of extracellular lactate dehydrogenase (LDH) enzyme level based on the cell permeability method is examined to approve the proposed mechanism for antibacterial activity of the prepared polymer/zeolite-Ag nanocomposite hydrogel sample. Referring to FIG. 9A, the release of LDH level by the polymer/zeolite-Ag nanocomposite interacted with two types of bacteria is disclosed. According to FIG. 9A, it is found that the LDH release for polymer/zeolite-Ag nanocomposite sample is comparatively higher than polymer/zeolite nanocomposite. However, the polymer/zeolite-Ag nanocomposite has similar behavior related to the Ag colloid sample.

Figure 9B:
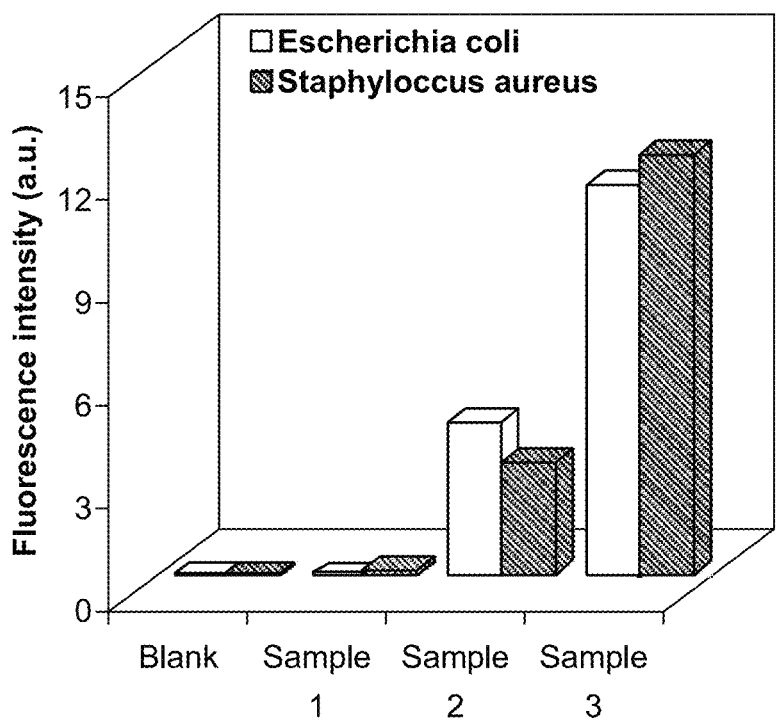
FIG. 9B exemplarily illustrates reactive oxygen species (ROS) generation against *Escherichia coli* and *Staphylococcus aureus* of different samples.

At the same time, the reactive oxygen level generated against *Escherichia coli* and *Staphylococcus aureus* in presence of the samples is tested and is described in FIG. 9B. It is clearly observed that the reactive oxygen species levels for polymer/zeolite-Ag nanocomposite sample is much higher than polymer/zeolite nanocomposite sample and is less than the Ag colloid sample, that is only trace levels of silver ions is present in the system containing the nanocomposite sample. Based on this observation, the generation of reactive oxygen species (ROS) is the inconsequential and minor process. Also, it is a dominated mechanism for antibacterial activity due to a conversion of Ag nanoparticles from nanocomposite to form $Ag^+$ and also release of $Ag^+$. Further, the electrostatic forces might be an additional cause for the main process of antibacterial mechanism. For these reasons, it is possible to expect an electrostatic interaction of the Ag nanoparticles in surface of the applied nanocomposite with the bacteria, where there is definitely friction of the Ag nanoparticles due to their movement inside the polymer and also zeolite matrix; this could create a charge on the surface of the prepared polymer nanocomposite. It could be a preferential mechanism for antibacterial activity of the prepared polymer/zeolite-Ag nanocomposite sample. All these phenomena suggest that the dominated mechanism for antibacterial activity attaches the nanocomposite to the bacterial cell as shown in FIG. 10A. Consequently, in some cells, the cell walls are seriously damaged, as shown in FIG. 10B. The antibacterial activity of nanocomposite creates a

TABLE 3

Zone of inhibition, MIC and MBC results toward *Staphylococcus aureus* and *Escherichia coli* bacteria with Sample 1: polymer/zeolite nanocomposite, sample 2: polymer/zeolite-Ag nanocomposite and sample 3: Ag colloid

| Sample | Zone of inhibition (mm) | | MIC (mg/ml) | | MBC (mg/ml) | |
| --- | --- | --- | --- | --- | --- | --- |
| | E. coli | S. aureus | E. coli | S. aureus | E. coli | S. aureus |
| polymer/zeolite nanocomposite | 6 ± 0.87 | 9 ± 0.42 | 0.355 | 0.315 | 0.460 | 0.435 |
| polymer/zeolite Ag nanocomposite | 32 ± 0.11 | 34 ± 0.56 | 0.081 | 0.075 | 0.125 | 0.012 |
| Ag colloid | 36 ± 0.65 | 36 ± 73 | 0.060 | 0.052 | 0.080 | 0.065 | big gap between the cytoplasm membrane and the cell wall of the nanocomposite-treated *Escherichia coli* cells as shown in FIG. 10D compared with the normal cytoplasm membrane, as shown in FIG. 10C.

Example-20: Influence of Nanocomposite on SRBs Activity

The effect of composites on the SRBs activity is examined using the inhibition effect of nanocomposites. The inhibition effect of nanocomposites at different Ag nanoparticle loadings are examined to observe the effect of composites in the activity of SRBs. From the obtained results and the sulfate reduction profiles of batch reactors exposed to the composites during 168 h, almost all sulfates are reduced in the control reactor after 168 hours indicating more than 96% of sulfate reduction efficiency. The average sulfate removal efficiencies are 94.5%, and 5.0% (for control sample), when exposed to nanocomposite and control sample concentration of 100 µg/mL, respectively, after 168 hours of reaction time. For the batch reactors spiked with prepared nanocomposites at different loading of silver nanoparticles, the average residual concentrations of sulfate as a direct indication of SRBs inhibition has no remarkable increase with increase in silver stoichiometric ratios from 30 to 240 µg/L. Sulfate reduction is 95.2%, 95.45, 95.8%, 95.9% and 96.0% for silver loadings of (30 µg/L), (60 µg/L), (90 µg/L), (120 µg/L) and (240) µg/L), respectively. Therefore, the effect of nanocomposite on SRBs sulfate reduction performance is independent on silver stoichiometric ratios.

FIG. 11 exemplarily illustrates a schematic diagram of water hardness removal system 1100, according to an embodiment of the present invention. In order to determine the efficiency of water hardness removal, the simple procedure based on batch experiments are carried out. The system comprises one or more columns 1102, a raw water inlet 1104, a drain 1106, a brine suction 1108, a backwash 1110, a test valve 1112 and a processed water outlet 1114. In one embodiment, the lab set up includes three columns 1102 with the tubing set to pass the fluid simultaneously and separately. FIG. 12 exemplarily illustrates the top perspective view of the water hardness removal system 1200, according to an embodiment of the present invention. Based on the applied water flow rate, more than one column is used as shown in FIGS. 11 and 12.

As a potential application of the fabricated nanocomposite, the water softening of prepared synthetic solutions of hard water as stock solution and antibacterial activity are examined by utilizing the nanocomposite as the water filter cartridge based on ion exchange technology and synergistic effect of silver nanoparticles in nanocomposite hydrogel. In one embodiment, the microemulsion method is used to produce semi-interpenetrating polymer networks/zeolite-Ag hydrogel nanocomposite due to the controlled shape and size with high mono-dispersity and particle size distribution.

The water filter cartridge of the present invention is reduced in fluctuation infiltration flow rate and infiltration performance due to a unique combination of polymer and zeolite and silver nanoparticles with good porosity and adsorption capacity. The water filter cartridge has stable performance even in the case of large-scale production. Furthermore, as the water purifier of the present invention is equipped with water filter cartridge simple and available equipment. According to the present invention, the hydrogel nanocomposite could be well carried out even to the inside of the particles with good swelling particles having high mechanical strength due to existence of the zeolite and silver nanoparticle in polymer matrix, and a cation exchange resin having a high ion exchange capacity could be obtained. Furthermore, since the polymer hydrogel nanocomposites are prepared with a simple manner without essential equipment, the process of the present invention is very desirable for industrial practice.

The obtained hydrogel nanocomposite with high ion exchange capacity has stable performance for a long time and after several times without backwash. Backwash could be well carried out after a long-time usage of hydrogel nanocomposite due to synergistic effect of polymer structure and zeolite (NaY zeolite nanoparticles). According to the present invention, the composite is a nanocomposite with synergistic effect and engineering structure of a 3D polymer network with specific/functionalized cell groups with zeolite nanoparticles with ion exchange capacity and high absorption capacity. Also, in addition to the water hardness removal, it has a high anti-bacterial property. The present invention further eliminates the problem of early backwash, which is a major limitation in the existing arts.

In accordance with the nanocomposite of the present invention, a low dosage of zeolite and silver nanoparticles are used. The prepared nanocomposite comprises many features including, but not limited to: (i) low dosage of nanoparticles, (ii) availability of wide range of zeolite in IRAN, (iii) reduction of backwash of applied nanocomposite, (iv) low environmental impact, (v) high mechanical strength at high pressures and temperature due to usage of silver and zeolite nanoparticles, (vi) simple procedure for preparation of nanocomposite and also simple processing for water hardness removal without time and money consuming and simplicity in operation (economical forming and processing), and (vii) good antibacterial activity. Further, the present invention provides a filter with a synergic effect of engineering polymer matrix and zeolite/silver nanoparticles with large surface area adsorption and ion exchange capacity for pre-treatment of water, which could be effective and acceptable for industrial uses.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

What is claimed is:

1. A composition for controlling water hardness, comprising: a plurality of semi-interpenetrating polymer nanocomposites, including a polymer matrix dispersed with a plurality of zeolite nanoparticles and a plurality of silver (Ag) nanoparticles, wherein the nanocomposite is polymerized using methyl methacrylate (MMA) in presence of ethylene glycol dimethacrylate (EGDM) cross-linker for MMA monomer, acrylamide (AAm), acrylic acid (AAc) and linear poly vinyl alcohol (PVA) monomers in the presence of N,N'-methylene bisacrylamide (MBA) cross-linker and Triton X-100 surfactant.

2. A filter cartridge assembly for a water treatment device, comprising:
- a housing incorporated with a plurality of semi-interpenetrating zeolite-silver (Ag) polymer nanocomposites, including a cross-linked polymer matrix dispersed with a plurality of zeolite nanoparticles and a plurality of silver nanoparticles.

3. The filter cartridge assembly of claim 2, wherein the housing is a tubular polycarbonate housing.

4. The filter cartridge assembly of claim 2, wherein the nanocomposite is polymerized using methyl methacrylate (MMA) in the presence of ethylene glycol dimethacrylate (EGDM) cross-linker for MMA monomer, acrylamide (AAm), acrylic acid (AAc) and linear poly vinyl alcohol (PVA) monomers in the presence of N,N'-methylene bisacrylamide (MBA) cross-linker and Triton X-100 surfactant.

5. The filter cartridge assembly of claim 2, wherein the polymer matrix is a cross-linked polymethyl methacrylate (PMMA).

6. The filter cartridge assembly of claim 2, wherein the nanocomposite is in resin form.

7. The filter cartridge assembly of claim 2, wherein the nanocomposite is in pellet form.

8. A method of producing a nanocomposite hydrogel water filter cartridge for controlling water hardness, comprising the steps of:
- forming a stable silver (Ag) colloid in a water-in-oil microemulsion;
- forming a stable zeolite colloid in a water-in-oil microemulsion;
- forming a stable zeolite-silver colloid in a water-in-oil microemulsion by mixing the silver and zeolite colloid, and
- forming a semi-interpenetrating zeolite-silver nanocomposite hydrogel and
- further comprising a step of: preparing a water filter cartridge using the semi-interpenetrating zeolite-silver nanocomposite hydrogel.

9. The method of claim 8, wherein the step of forming the stable silver colloid comprises the steps of:
- dispersing a plurality of silver nanoparticles in a water-in-oil microemulsion;
- mixing the silver nanoparticles with a solution including a surfactant, acyl amide, N,N'-methylene bisacrylamide, NaOH and methyl methacrylate (MMA) monomers, and
- forming the stable silver colloid by adding co-surfactant.

10. The method of claim 9, wherein the surfactant is octylphenol ethylene oxide.

11. The method of claim 8, wherein the step of forming the stable zeolite colloid comprises the steps of:
- dispersing a plurality of zeolite nanoparticles in a water-in-oil microemulsion;
- mixing the zeolite nanoparticles with a solution including a surfactant, acyl amide, N,N'-methylene bisacrylamide, NaOH and methyl methacrylate (MMA) monomers, and
- forming the stable zeolite colloid by adding co-surfactant.

* * * * *